(12) United States Patent
Ahmadi

(10) Patent No.: US 12,141,740 B2
(45) Date of Patent: Nov. 12, 2024

(54) SYSTEM OF UNIT/CARGO DYNAMIC TRAFFIC AND SCHEDULE MANAGEMENT

(71) Applicant: Peyman Ahmadi, Jerome, ID (US)

(72) Inventor: Peyman Ahmadi, Jerome, ID (US)

( * ) Notice: Subject to any disclaimer, the term of this patent is extended or adjusted under 35 U.S.C. 154(b) by 460 days.

(21) Appl. No.: 16/180,821

(22) Filed: Nov. 5, 2018

(65) Prior Publication Data

US 2020/0143320 A1 May 7, 2020
US 2023/0259867 A9 Aug. 17, 2023

Related U.S. Application Data

(60) Provisional application No. 62/581,351, filed on Nov. 3, 2017.

(51) Int. Cl.
*G06Q 10/0833* (2023.01)
*G06Q 10/083* (2023.01)

(52) U.S. Cl.
CPC ..... *G06Q 10/0833* (2013.01); *G06Q 10/0838* (2013.01)

(58) Field of Classification Search
CPC .......... G06Q 10/0833; G06Q 10/0838; G06Q 10/08355
USPC ......................................................... 705/333
See application file for complete search history.

(56) References Cited

U.S. PATENT DOCUMENTS

| | | | |
|---|---|---|---|
| 2015/0161696 A1* | 6/2015 | Jones ................ | H04W 4/30 705/26.4 |
| 2016/0110976 A1* | 4/2016 | Mains, Jr. ............. | H04W 4/029 340/572.8 |
| 2018/0144630 A1* | 5/2018 | Augustine .......... | G06Q 30/0645 |
| 2019/0066041 A1* | 2/2019 | Hance .................. | B65G 1/137 |
| 2019/0164128 A1* | 5/2019 | Millhouse ........ | G06Q 10/06312 |
| 2020/0051005 A1* | 2/2020 | Ayoub .................. | G06V 20/10 |

* cited by examiner

*Primary Examiner* — Igor N Borissov

(57) ABSTRACT

Electronic methods and system of inbound and outbound transport unit/cargo, traffic and schedule management, assistance and assignment based on relevant resource availability and transport unit progress and in advance unrecoverable delay recognition.

21 Claims, 22 Drawing Sheets

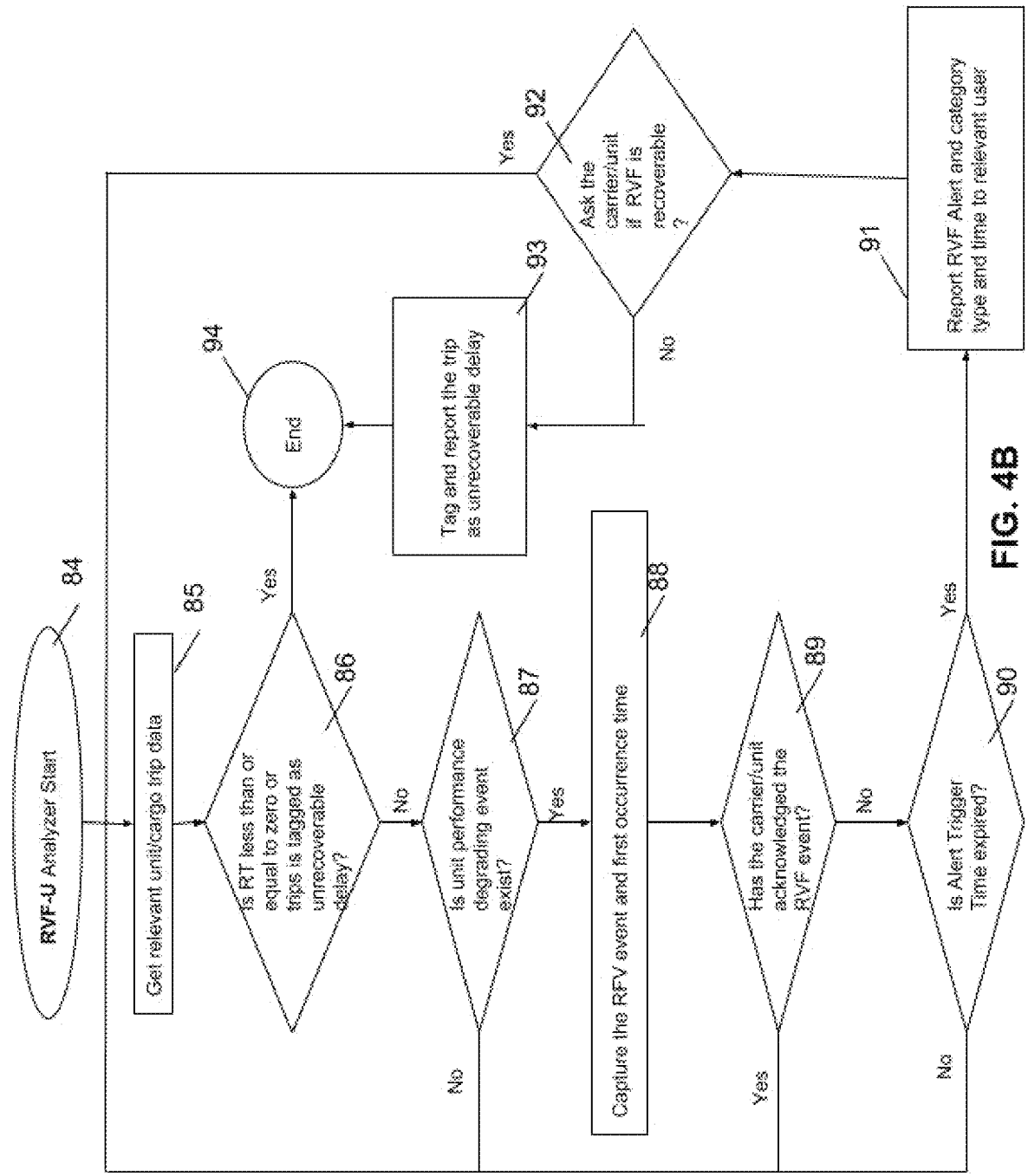

Advanced Settings for Offer Suggestion

|  | North | East | West | South |
|---|---|---|---|---|
| Max travel distance (miles) | 800 | 1000 | 500 | 600 |
| Min price ($/mile) | $2.00 | $1.80 | $2.20 | $2.10 |
| Desired price ($/mile) | $2.30 | $2.10 | $2.30 | $2.20 |
| Price adjustment($/mile) per distance | +$0.15 / 400 mi | -$0.15 / 500 mi | +$0.12 / 300 mi | +$0.10 / 600 mi |
| Price deduction($/mile) per rejection | $0.10 | $0.20 | $0.05 | $0.05 |

☑ Include deadhead miles in calculations

Choose a center

[Seattle, WA]

● Current location of unit
○

Price adjustment for load destination transport-unit to load ratio

Price adjustment($/mile)  [$0.15]  per transport-unit to load ratio  [1.2]

Price adjustment($/Load maintenance, securement TDT)  [$0.85 /min] — 400  Charge free time [30min] — 401

Price adjustment($/Facility resources TDT)  [$0.55 /min] — 400

● Charge free time [60min] — 403
○ Charge free time equal To average industry TDT

FIG. 14

Equipment Quality Table

| | Reported Late Arrival per month | Reported breakdown history under load for last 6-month (0 - 30) | Equipment Age (1-20) | Overall Equipment Rating (0 - 100) |
|---|---|---|---|---|
| Tractor 1 | 1 | | 1 | 89 |
| Tractor 2 | 0 | | 3 | 92 |

450 → Reported Late Arrival per month
451 → Reported breakdown history under load for last 6-month

FIG. 15

| | Years of Experience (0 - 20 years) | Proceed Order Refusals | Reported Late Arrivals per Month (0 - 30) | safety score (0-100) | Feedback Rating (0-100) | Ignoring RVF-R Alert resulting in unrecoverable Delay | Number of Accidents for last 2 years (0-10) | Overall Element Rating (0 - 100) |
|---|---|---|---|---|---|---|---|---|
| Driver 1 | 1 | 2 | 0 | 0 | 60 | 1 | 0 | 25 |
| Driver 2 | 5 | 0 | 0 | 0 | 60 | 0 | 0 | 75 |

Driver Quality Table — 460, 461

FIG. 16

Lot 4 - January 20 2017

| Lift Truck 1 | | Lift Truck 2 | |
|---|---|---|---|
| L# 238 TDT 1Hr: | 08:00 - 09:00 | Tentatively Reserve for L #33 TDT 1hr 30min | 08:00 - 09:30 |
| L# 240 TDT 0.5Hr: | 09:00 - 09:30 | | |
| Open | 10:45 - 10:30 | L# 240 TDT 0.5Hr: | 09:30 - 10:15 |
| L# 240 TDT 0.5Hr: | 10:00 - 10:30 | L# 250 TDT 45min: | 10:15 - 10:45 |
| Tentatively Reserve for L #31 TDT 1hr 30min | 10:30 - 12:00 | Tentatively Reserve for L #30 TDT 1hr URRT 10:45 | 10:45 - 11:45 |
| | | Open | 11:45 - 12:00 |

SYSTEM OF UNIT/CARGO DYNAMIC TRAFFIC AND SCHEDULE MANAGEMENT

CROSS-REFERENCE TO RELATED APPLICATIONS

This Nonprovisional patent application claims the benefit of U.S. Provisional Patent No. 62/581,351 filed on Nov. 3, 2017.

BACKGROUND OF THE INVENTION

Management of dispatched units and loading/unloading schedule is one of the most challenging and complex part of logistic. The smooth flow of trucks in and out of the facility greatly affect the efficiency and profitability of all involved parties. In most cases the appointment time is set prior to dispatch and based on availability of shipper or receiver schedule. However even when assigned appointment time may be certain and bonding, the timely arrival of unit that yet to arrive is uncertain due to factors that are unknown and cannot be predicted at the dispatch time by carrier (i.e. accident, road closure, traffic, breakdown etc.). It is common practice by some shippers to give carrier more time than a trip requires when possible. This is to allow a cushion time for unexpected to avoid the expense of delay on shipper resource. However, this practice adds to driver unproductivity and carrier cost of idled unit which is now committed to more time that the trip requires. Often drivers arrive earlier than schedule and ask to be accommodated upon arrival which result in unnecessary burden on shipper's facility and resources. In many cases the untimely units are asked to leave the high traffic and congested facility to return later, adding more cost to the carrier and consuming more of the driver available hour of service. On the other hand, often, trucks will not arrive in a timely manner for their scheduled time. This in turn force shippers or receivers to constantly remain vigilant to every inbound transport-unit progress by monitoring unreliable estimated time of arrival provided by track and trace tools. Similarly, fixed and inflexible schedule would also create complications when a facility faces a breakdown of resource responsible for loading/unloading or in the case of a delayed cargo that needs to be reloaded. Any such irregularity will affect the timely arrived transport-units which often have to leave the limited in demand facility and return at later time leading to further complication, cost, consumption of driver limited hours of service and related detention cost.

Shippers, receivers, carriers and drivers would greatly benefit if a system would dynamically adjust the schedule based on each unit progress and resource availability. If system notify users with actionable data at the moment it detects that a unit/load no longer can comply with its deadline (long before the deadline is reached), shippers/receivers no longer have to commit resources or time and are relieved from constantly monitoring the location and estimated time of arrivals of the units/loads. Moreover, this gives shippers/receivers the ability to find the best and cheapest remedy in time since given advanced notice is based on accurate and certain data rather than doubtful estimations. (receiving undetermined estimated data vs determined and actionable data).

BRIEF DESCRIPTION OF THE SEVERAL VIEWS OF THE DRAWING

FIG. 4B is the exemplary diagram of how the system issues RVF_U alert.

FIG. 14 is the exemplary picture of how calculated TDTs would be used to adjust price offer for a load.

FIG. 15 is the exemplary picture of how RVF-U alert would be used to update the equipment quality in the database.

FIG. 16 is the exemplary picture of how ignoring RVF-R alert and proceed order refusal would be used to update the driver quality in database.

FIG. 17 is the exemplary picture of how the DTSM system monitors and manages time slots in the resource schedule digital calendar.

DETAILED DESCRIPTION OF THE INVENTION

Figure 1:
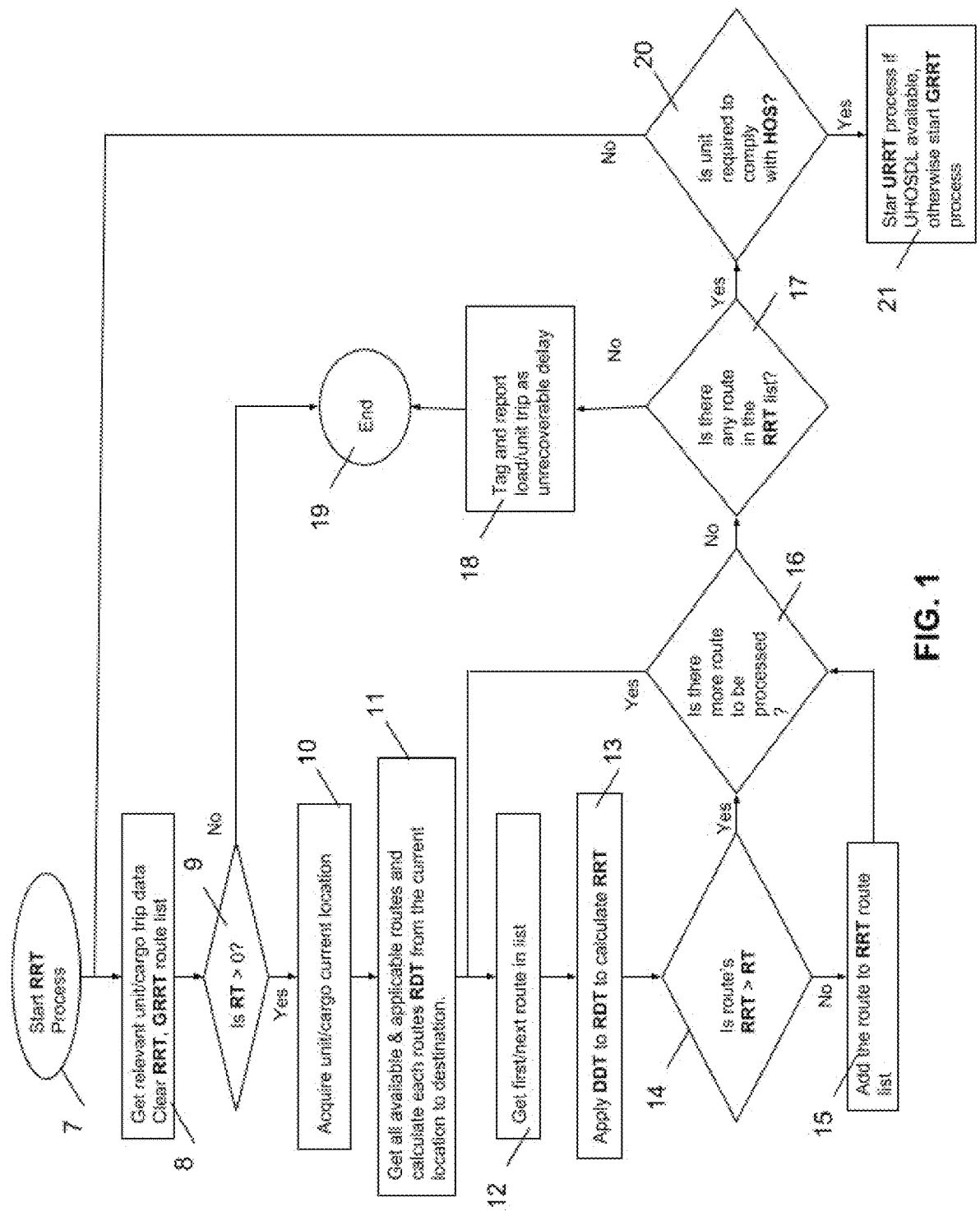
FIG. 1 is the exemplary diagram of how the system applying RRT to determine unrecoverable delay in advance before SAD expires.

In following text and diagrams same numerals signify similar entities (methods or items). Pictures, flow diagrams, mathematical formulas and screenshots provided herein are provided as examples to clarify the system and methods described by the invention and by no means are intended to limit or narrow the scope of the invention to one variation. Accordingly, any component of the present invention may be implemented as entirely hardware solution (FPGA, integrated chips etc.), entirely software approach (i.e. firmware, software etc.) or a combination of both approach when applicable. Although over the road transport-unit type is used to explain and illustrate the invention, however the description and illustration hereafter should not be construed to limit the application of the invention only to one variation. The same logic and methods could be used to create the same benefits for scheduling the transport-unit/cargo for other types of transportation that are not limited by road, including but not limited to ship, airplane and train. The system described here would further consider other applicable transportation unit/types when cargo must be transported by a type or change hand from one unit/type to another from the given origin to destination. However, to avoid repetition of obvious only the over the road transport-unit is specified here. Hence relevant terms, applicable limitation and regulation are used.

The term load or cargo are used interchangeably herein to refer to any item that needs to be transported (i.e. people, vehicles, food, products, livestock, materials and goods, etc.). The terms transport-unit, unit or truck are used interchangeably herein to refer to any vehicle capable of transporting loads which drive autonomously or by a driver. The term carrier is used herein to refer to any person or organization who own or is in charge of one or more transport-unit(s). The term shipper is used herein to refer to any individual or organization that hires a transport-unit to pick up or deliver a load. The term consignee or receiver is used herein interchangeably to refer to any person or organization that is designated and authorized by shipper to receive a load. terms unit/load, load/unit, unit/cargo, cargo/unit are used interchangeably hereafter to refer to whichever or both when applicable.

Time-Range hereafter is referred to a continuous range of time with a specific start and end time. (i.e. Nov. 1, 2018 2:00 Pm to Nov. 3, 2018 3:45 Pm).

Time-Span hereafter is referred to a continuous range of time (i.e. 5 seconds, 2 hours, 3 days, etc.) which does not have specific start or end date.

Time-Slot hereafter is referred to a minimum Time-Span that is required by a resource to accommodate a load/unit TDT in the resource schedule calendar. (i.e. loading time 55 min.).

Committed Time-Slot hereafter is referred to a Time-Slot that is committed to for a load/unit in the resource schedule calendar. Unlike time-slot, committed time slot has a start and end time (i.e. Nov. 1, 2018 2:00 Pm to 2:55 Pm).

Floating Time-Slot hereafter is referred to a time-slot that is reserved and assigned tentatively for a load/unit in the resource schedule calendar and could be switched by system automatically with other similar compatible floating time-slot when applicable. Floating time slot also has a start and end time (i.e. Nov. 1, 2018 2:00 Pm to 2:55 Pm).

Resource Task Duty Time (TDT) hereafter is referred to average time spent by an identifiable resource to perform an identifiable task where in resource could be human, machinery or robotic system.

Facility Average Task Duty Time (FA-TDT) hereafter is referred to average of all TDTs for each category for a facility in any given time.

Industry Average Task Duty Time (IA-TDT) hereafter is referred to average of all stored TDTs for each category in any given time.

Route Continuous Driving Time (RDT) hereafter is referred to minimum time required to travel from a given location to the route's destination assuming non-stop driving, which is calculated based on the road posted speed limits and mileage for each given route regardless of transport-unit or transport-unit's driver limitations/restrictions.

Enhanced Route Continuous Driving Time (ERDT) hereafter is referred to sum of the RDT and additional times that is imposed by real time events (i.e. slow down due to traffic, accident, weather condition etc.) for a given route regardless of transport-unit or transport-unit's driver limitations/restrictions.

Determined Duty Task (DDT) hereafter is referred to combination of all task duty times (TDT) that a given trip requires based on the current progress and status of the unit/cargo. Applicable TDTs for each trip is determined by unit/cargo characteristics and requirement based on regulations and industry standards. Hence DDT is a known factor before the trip starts. For example, if the unit is at pickup location but has not picked up the load yet the DDT for the trip at that moment would compromise of following TDTs if applicable.
  a. Loading TDT for pickup
  b. Securement TDT for the load pickup
  c. Unit required refueling/recharging TDT based on unit capacity, usage and current status
  d. All required load/unit inspection and maintenance TDTs Route Required Time (RRT) hereafter is referred to combination of the RDT and the DDT for a given route.

Route Enhanced Required Time (ERRT) hereafter is referred to combination of the ERDT and the DDT for a given route.

Scheduled Arrival Deadline (SAD) hereafter is referred to the date and time when a unit/cargo is scheduled to arrive at a given location. (i.e. 11 Sep. 2017, 08:00 am). If the arrival time is not an exact time but a range of continuous time (i.e. 11 Sep. 2017, 08:00 am to 05:00 pm) the latest boundary of the range is considered as the Scheduled Arrival Deadline.

Remaining Time (RT) hereafter is referred to remaining time from the current time until Scheduled Arrival Time (SAD).

Hours of Service Driving Limitation (HOSDL) hereafter is referred to Hours of Service regulation imposed by regulatory body limiting the daily/weekly driving hours for a commercial driver.

Unit's Current Hours of Service Driving Limitation (UHOSDL) hereafter is referred to hour of service remaining driving time for a given transport-unit. UHOSDL is determined based on number of drivers assigned to the transport-unit and drivers' remaining HOS and applicable relevant HOS limitations at a given time. In case of other applications (i.e. autonomous vehicles) UHOSDL is any limitation imposed by carrier or regulation.

General Regulate Required Time (GRRT) hereafter is referred to the time required to travel from a given location to the route destination after the Hours of Service Driving Limitation (HOSDL) is applied to a given route. GRRT is calculated without considering unit's current consumed hour of service. HOS regulation limitation will add additional regulated non-driving time to the RDT. For example, in case of 25 hours non-stop RDT, GRRT would extend the time to 46 hours based on the current HOS regulation:
  GRRT=8 hr driving+0.5 hr mandatory break+3 hr driving+10 hr rest+8 hr driving+0.5 hr break+3 hr driving+10 hr rest+3 hr driving=46 hr.

Unit Regulated Required Time (URRT) hereafter is referred to time required to travel from a given location to the route's destination considering Unit's Current Hours of Service Driving Limitation (UHOSDL) applied to a given route. URRT is calculated based on the most efficient use of the transport-unit's current remaining hour of service. For example, in case of 25 hours non-stop RDT and assuming driver begins with 7 hours out of 11 hours driving time/14 hours on duty time without yet taking the required 0.5-hour break, URRT would extend the time to 46.5 hours based on the current HOS regulation:
  Scenario 1: Assuming driver continue driving and current DOT regulation:

URRT=1 hr driving+0.5 hr break+3 hr driving+10 hr rest+8 hr driving+0.5 hr break+3 hr driving+10 hr rest+8 hr driving+0.5 hr break+2 hr driving=46.5 hr.

Scenario 2: Assuming driver take the regulated rest now:

URRT=10 hr rest+8 hr driving+0.5 hr break+3 hr driving+ 10 hr rest+8 hr driving+0.5 hr break+3 hr driving+10 hr rest+3 hr driving=56 hr.

Recoverable Delay Variable Factor (RVF) hereafter is referred to factors that have potential to cause delays but have not yet affected the timely arrival of the unit/cargo. However, they will cause unrecoverable delay later if no mitigating action is taken in time. Few Examples of RVF are as follows: current traffic speed that is less than road posted speed limit, any serious disabling or performance degrading unit trouble code (engine or transmission, etc.) or misuse of hour of service etc.

System described hereafter is one variation of how system of unit/cargo dynamic traffic and schedule management utilize "delay analyzer" and "unit/cargo dynamic traffic and schedule management system" to manage the traffic and scheduling of cargo and unit. Said system communicates and shares data with system described in the patent application "Integrated system of electronic matching, negotiation, dispatch and rating for cargo and transport-unit based on individual transport-unit and its elements quality" (application Ser. No. 15/167,248 filed on 27 May 2016) and claims the benefit of any and all nobilities of the described systems combinations. System of unit/cargo dynamic traffic and schedule management works in conjunction with other systems to acquire applicable and necessary unit/cargo/trip data and provide the results to collaborating system in particular the system described in patent application Ser. No. 15/167,248 and utilizes the same type of infrastructure and resources.

Delay Analyzer: Delay Analyzer system requires access to transport-unit/cargo real time location (i.e. unit's on-board GPS device, third party, ELD, cell phone app, GPS device embedded in load, etc.). Delay analyzer mechanism monitor's each transport-unit/cargo individually when a unit/cargo is required to comply with a timeline. Delay analyzer compromise of two subsystem: a) A subsystem to detects and reports in advance when a unit/cargo is no longer able to comply with Scheduled Arrival Deadline (SAD). b) to detect, warn, and provide mitigating instruction about events that have not yet affected the timely arrival of the unit/cargo but have a potential to cause unrecoverable delay if no mitigating action is taken in time. Delay Analyzer could also be utilized prior to dispatch for compatibility check purpose in load and cargo matching programs (i.e. whether unit meeting cargo pick up deadline).

Unrecoverable Delay Detection: System continuously monitors RDT, GRRT and URRT in real time to detect and report unrecoverable delay to relevant parties (18, 36, 54, 95) at the moment it occurs as depicted in FIG. 1, 2, 3, 5. Hence affected parties have ample time to find the best remedy ahead of time before damaging effect of the delay take place or to lessen the costly impact which will worsen as the user has fewer options and less time to react as time progress (i.e. crane appointment that could be rescheduled given sufficient time, etc.). When an unrecoverable delay event is detected, such data along with associated projected delay time is fed to and utilized by Unit/Cargo Dynamic Traffic and Schedule Management System (DTSM) as described later.

FIG. 1 is an exemplary diagram that illustrates the first step of delay analyzer. By acquiring the relevant unit/cargo trip data (8) and unit/cargo real time location (10), Delay Analyzer finds all available and applicable routes from current location of the unit/cargo to the destination (11). It then calculates routes' associated RDT (11) by utilizing any in-house or third party (Google map, Rand McNally, etc.) navigation software with access to posted road speed limits. System then apply all applicable Determined Duty Task (DDT) to the RDT to calculate the RRT time (13) for each route. System then compares each route's RRT with current remaining time (RT) (14) and store all the routes with RRT less than the current remaining time (RT) (15). Once system processed all the applicable routes (16), if RRT route list is empty (17) system tags and report the unit/load trip with unrecoverable delay status (18) and delay detection process ends for the unit/cargo (19). Otherwise the list of stored RRT routes (15) will be sent to GRRT or UURT program (21) for further processing if applicable (20), if not system restart the RRT process (7).

Figure 2:
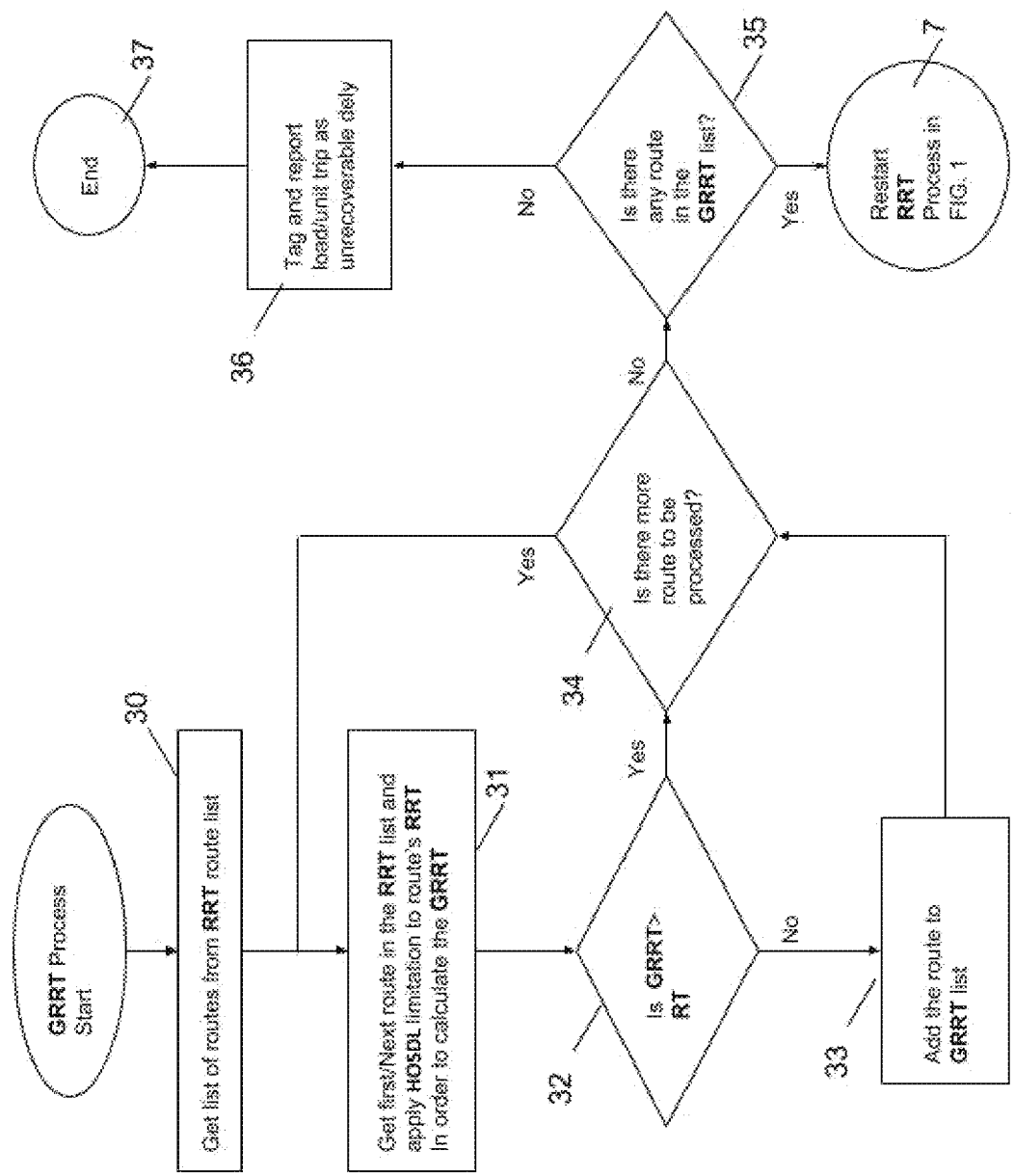
FIG. 2 is the exemplary diagram of how the system further applying GRRT to determine unrecoverable delay in advance before SAD expires.

GRRT program (FIG. 2) applies General Hours of Service Driving Limitation (HOSDL) (31) to RRT for each input route (30) to determine the GRRT. System then compares each route GRRT with current remaining time (RT) (32) and stores the routes when route's GRRT is less than the current remaining time (RT) (33). Once system processed all the routes (34), If GRRT route list is empty (35) system tags and report the unit/load trip with unrecoverable delay status (36) and delay detection process ends (37) for the unit/cargo. Otherwise system restart the RRT process (7).

Figure 3:
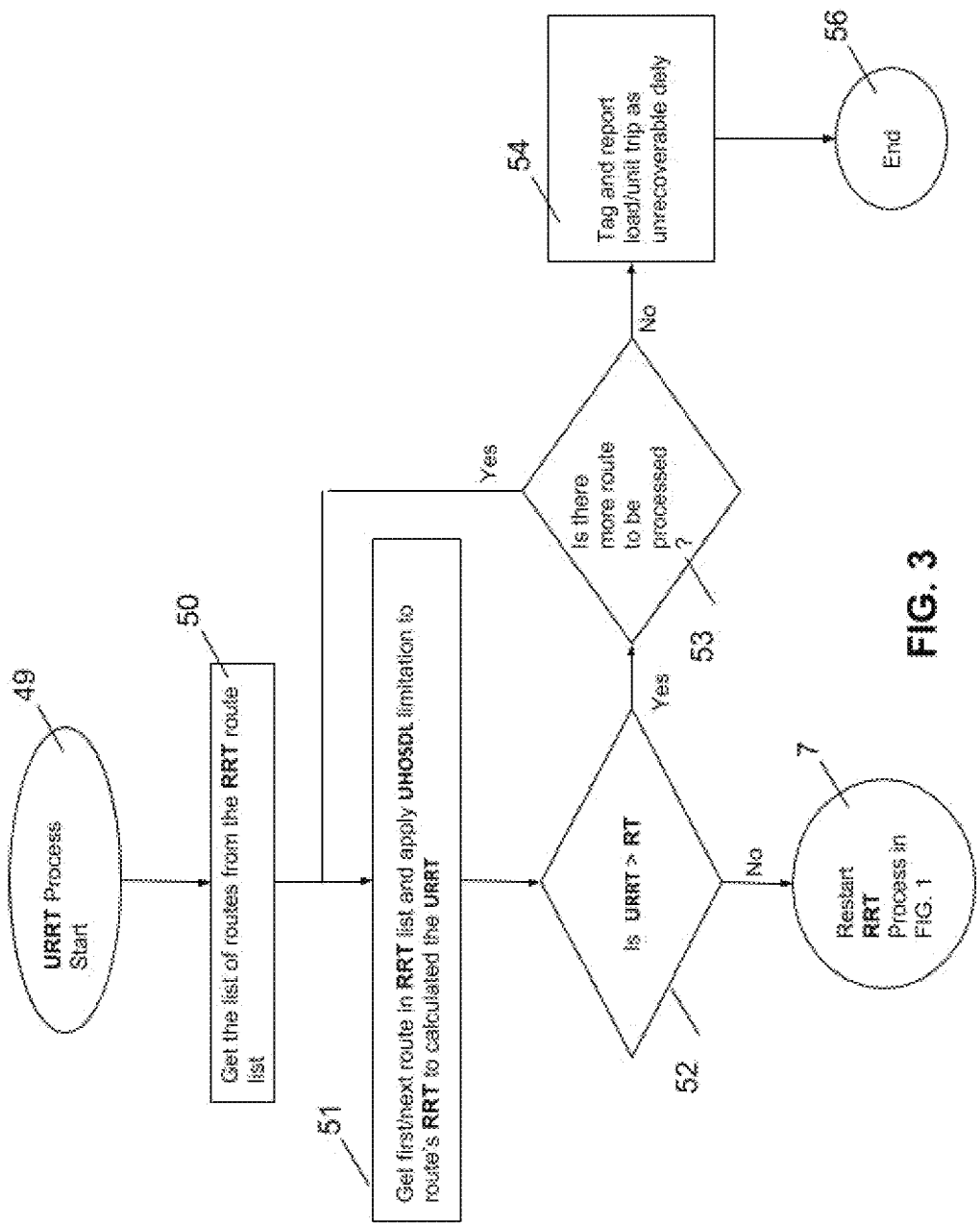
FIG. 3 is the exemplary diagram of how the system further applying URRT to determine unrecoverable delay in advance before SAD expires.

URRT program (FIG. 3) applies the Unit's Current Hours of Service Driving Limitation (UHOSDL) (51) to RRT for each input route (50). System then compares each route's URRT with current remaining time (RT) (52). If system finds any route with URRT less than RT, system schedule the process to be executed from beginning (7). Otherwise system tags and report the unit/load trip with unrecoverable delay status (54) and delay detection process ends for the unit/cargo (56).

RVF Alert Detection: Unlike predetermined factors such as route posted speed limits which are used by system to detect unrecoverable delays, there are non-predetermined factors (RVF) that could potentially impact the timely arrival of unit for a scheduled deadline at a later time, but their time impact on deadline is not conclusive at the moment they occur. Although Delay Analyzer mechanism would finally catch any unrecoverable delay once they occur, however by detecting and issuing RVF alerts and instructions to appropriate parties in advance, affected users have sufficient and actionable time to take corrective and preventative actions before such events turn into unrecoverable delays. Example of a system alert instruction is if driver taking a route which result in unrecoverable delay system would instruct the unit of alternative available routes or selected route facing congestion or road construction at particular time when unit would enter the corridor based on unit current progress. Another example is when a driver unknowingly taking unnecessary off duty time resulting in usage of unit future available time.

However if user cannot perform a preventative action to mitigate the situation due to factors outside user's control or system visibility (i.e. unit breakdown requiring mechanic update, etc.), user could update the system and tag RVF alert with a resolution update once such resolution is conclusively available. User could either indicate if RVF is still recoverable or will result in an unrecoverable delay in order to report unrecoverable delay long before such event is detected by Unrecoverable Delay Detection mechanism to give affected parties extra time to minimize the cost impact of the delay.

RVF results are also used to adjust relevant equipment quality (i.e. unit breakdown under dispatch FIG. 15 450, 451) or adjusting relevant driver's quality (i.e. misuse of HOS that has led to unrecoverable delay FIG. 16 460, 461) in quality database which is later used by offer negotiation as described in referenced patent application. System stores relevant time for RVF once alert/instruction have been issued. If user does not take available actions to remedy the situation and as a result unit/cargo does not arrive by SAD deadline system will update the responsible user's quality database with unsatisfactory performance for that load. Similarly, when transport unit breakdown has resulted in untimely arrival of cargo/unit system will update the equipment quality database accordingly. RVF Alerts could also be used to provide an extra layer of security for high value sensitive/hazmat load, etc. For example, system could notify the shipper to make preparation if a high value cargo may need to be moved to a secure facility.

Figure 5:
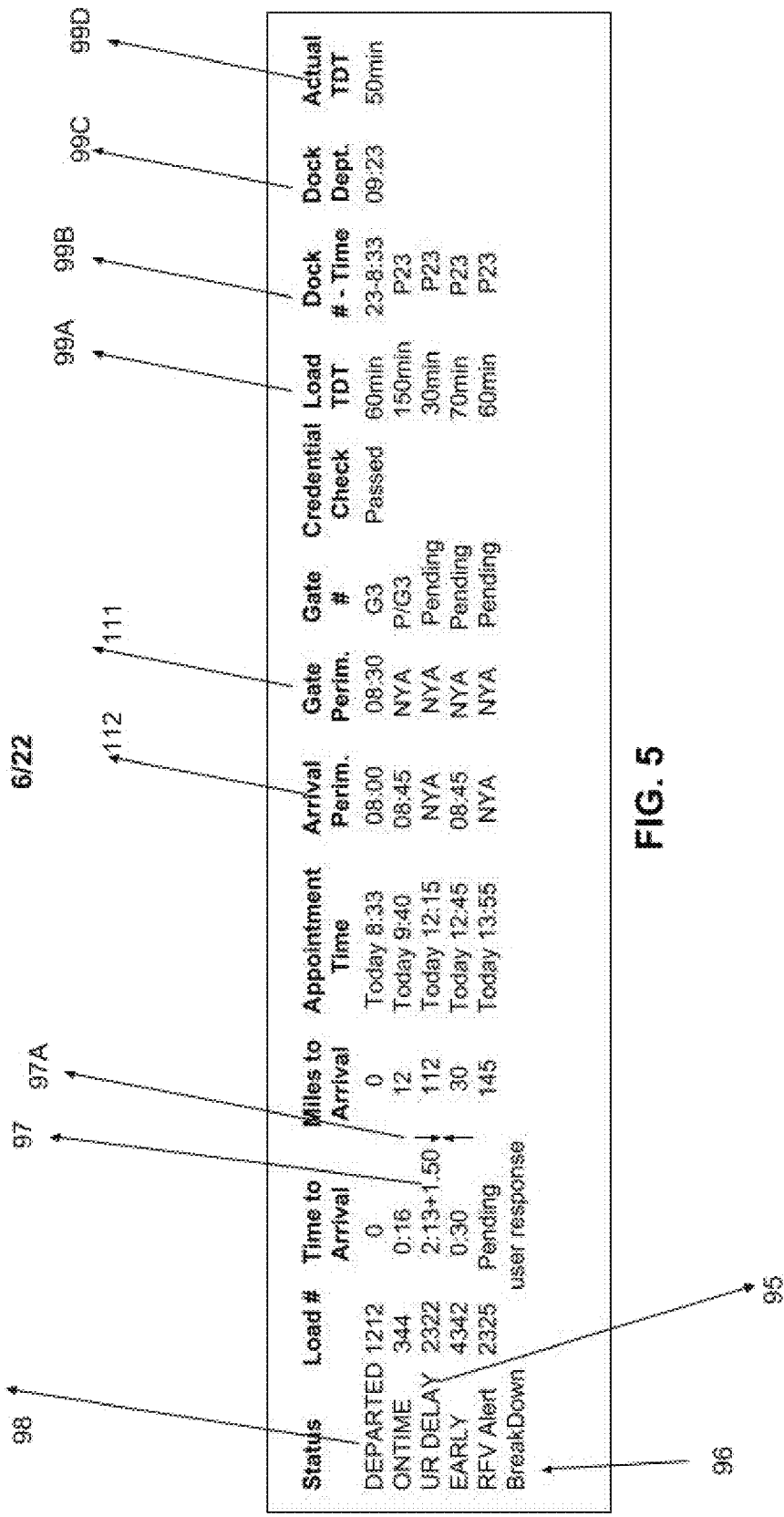
FIG. 5 is the exemplary picture of how the system monitors transport unit/cargo status and switches appointments in case of delay while notifying the user.

RFV alerts fall into two main category RVF-U and RFV-R. RFV-R considers the effect of all events related to the road/time that affect the scheduled deadline. However, RVF-U only considers events that result in degradation of transport unit's performance (i.e. engine disabling or crippling trouble codes) regardless of their impact on the scheduled deadline. Once an RVF alert is detected system will tag the alert with appropriate title (i.e. RVF alert due to traffic, engine trouble, HOS, etc.) so relevant users could make a decision based on the severity of alert. For example, HOS RVF Alert could be easily remedied by the driver taking action in time. FIG. 5 is an exemplary screenshot of how an affected user is notified (96) via user interface at the moment RVF alerts are detected.

Figure 4A:
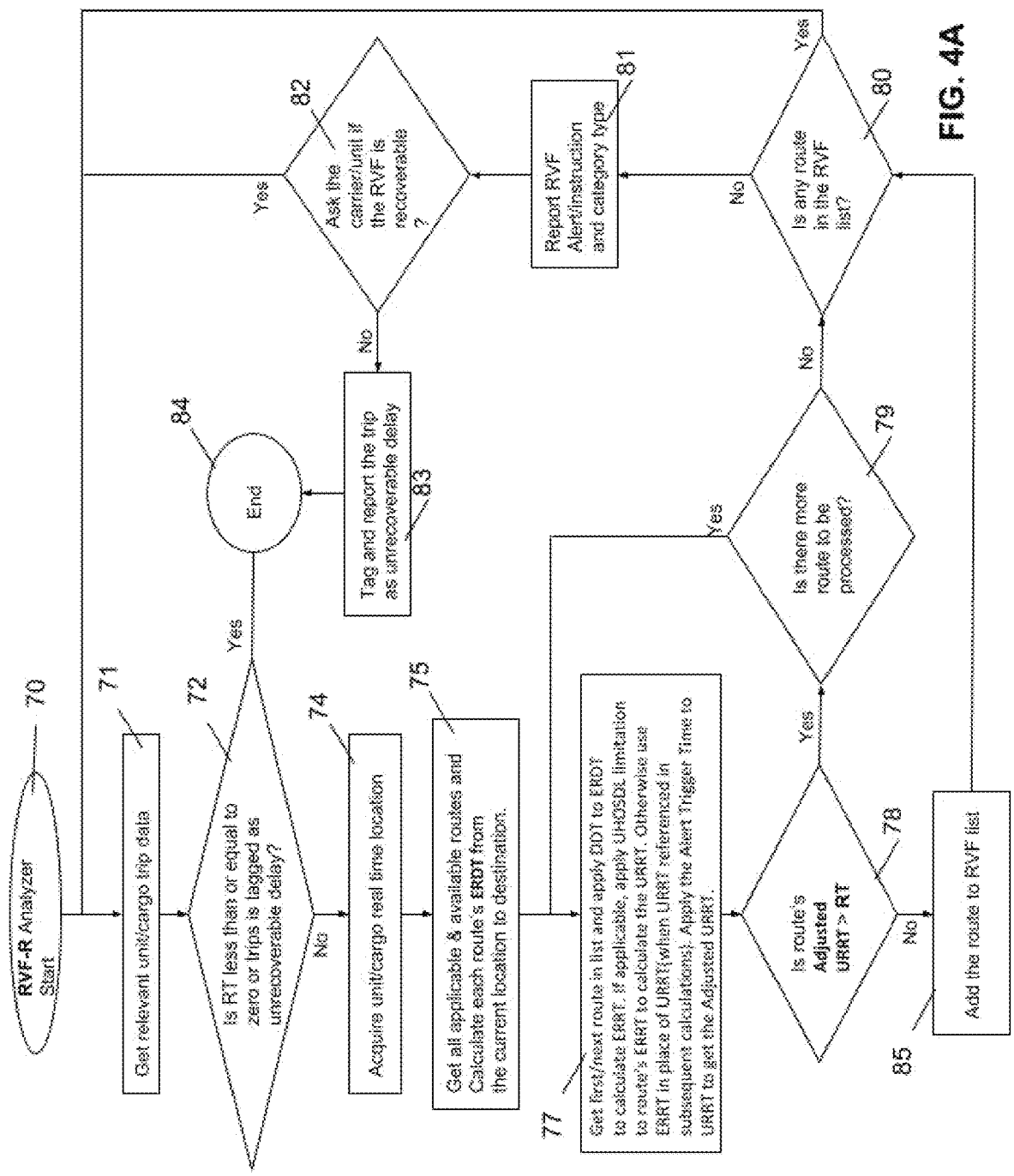
FIG. 4A is the exemplary diagram of how the system issues RVF_R alert.

FIG. 4A is an example of how RVF-R alert is generated. If RVF-R detection mechanism still applicable (72) system start by acquiring unit/cargo data (71) and real time location (74) and determine all available and applicable routes from unit/cargo current location to destination with their associate ERDT time (75) utilizing any navigation software with access to live traffic data, weather condition and road speed limits. System then applies the effect of DDT to ERDT to calculate the ERRT time (77). If unit is regulated by hours of service regulation limitation the URRT time is calculated by applying unit's UHOSDL to ERRT, otherwise the system will use the ERRT in place of the URRT (77). System then applies the predefined Alert Trigger Time to URRT to calculate the Adjusted-URRT (77). User can adjust Alert Trigger Time which is a time-margin before unrecoverable delay will occur. System then compares each route Adjusted-URRT with current remaining time (RT) (78) and stores the route when route's Adjusted-URRT is less than the current remaining time (RT) (85). Once system processed all the routes (79), if system could not find any route with Adjusted-URRT less than RT time (80) it will report RVF alert and relevant instruction to appropriate users (81) along with the category of the RVF. It then prompts the relevant user (82) to determine if the RVF is recoverable or lead to unrecoverable delay. If user tag the trip as unrecoverable status (83) the process ends for the unit/cargo (84). Otherwise system restart monitoring for further RVF conditions (70). As soon as the relevant user set the status of the RFV alert, system no longer resend the alert for that particular event. Appropriate users are notified via user interface to allow affected parties (i.e. shipper, receiver, carrier, driver, third party, etc.) to take precautionary step in time. For example, if a driver misusing the available hours of service in the manner which would potentially interferes with the timely arrival for the scheduled deadline (i.e. if a driver taking untimely or unusual long break or on duty time) system notify user with an RVF alert and requires a manual update from driver.

FIG. 4B is an example of how RVF-U alert is generated. If RVF-U detection mechanism still applicable (86) system start by acquiring relevant unit/cargo data (85) to monitor events that cause degradation in transport units' performance (87). System monitors data received from unit's Electronic Modules (i.e. Engine Controller Module, Trailer temperature sensor module indicating failure received from satellite communication, etc.) in real time via an onboard diagnostic device (i.e. OBD or similar ports) equipped with a wireless transmission. Hence system is able to detect any critical trouble code that may interfere with on time delivery or pick up appointment. Example of degrading or disabling trouble codes are engine power cut off with ignition on, transmission trouble code, emission creep mode or trailer refrigeration failure or any similar serious trouble code. In the event system receives said trouble codes (87) it records the initial occurrence time of the RVF alert in that category (88) and if the duration of such event exceeds predefined Alert Trigger Time (90) system issue an RVF alert with the time of occurrence and its category (91). System then requests a manual update from unit's driver or carrier authorized personnel (92) to verify whether the breakdown is recoverable and if that is the case system resume the operation for next cycle (84). Otherwise system tag and report such load/unit trip as unrecoverable delay (93) and process ends for the unit/cargo (94). When relevant user set the status of the RFV alert, system no longer resend the alert for that particular event (89).

When applicable, Delay Analyzer further considers unit/load other specific factors which may extend the required travel time. Necessary and relevant data is received from the load/unit data entry and identified by system as specific factors. Such factors are then applied to available routes applicable RDT, ERDT, GRRT, URRT, RRT, ERRT to find the list of applicable routes. An example of load/unit specific factor is that oversize load/unit may not be able to travel on nights or weekend, in road construction or hazardous weather condition in some or all available routes and hence it further extends the travel time for those routes. System additionally considers when unit will arrive at any particular section of road and what known regulation, limitation or restriction it may face at that time when it will be going through such section.

Figure 6:
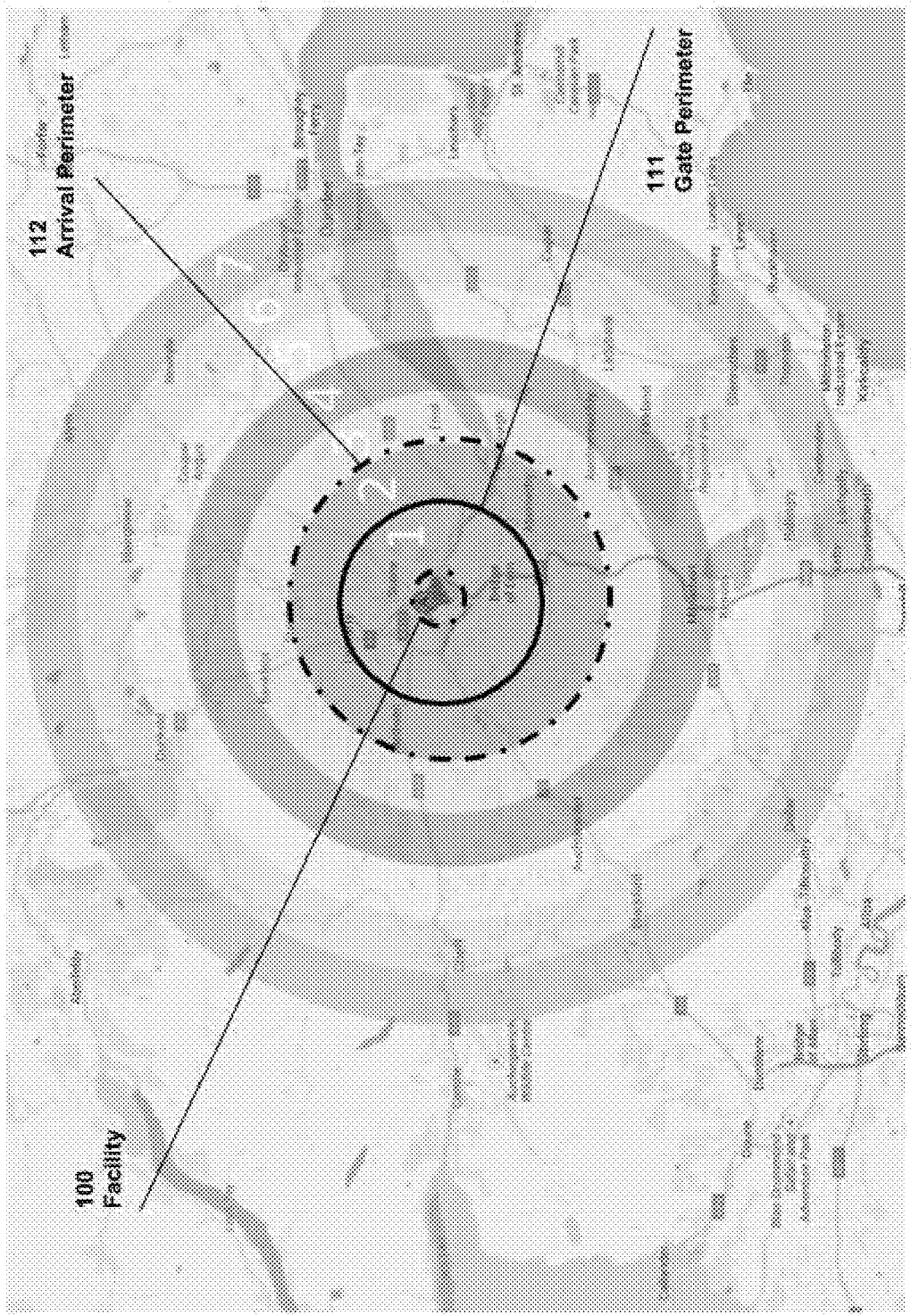
FIG. 6 is the exemplary picture of how the DTSM system enable user to choose and set one or multiple overlapping geofence perimeter.
Figure 7:
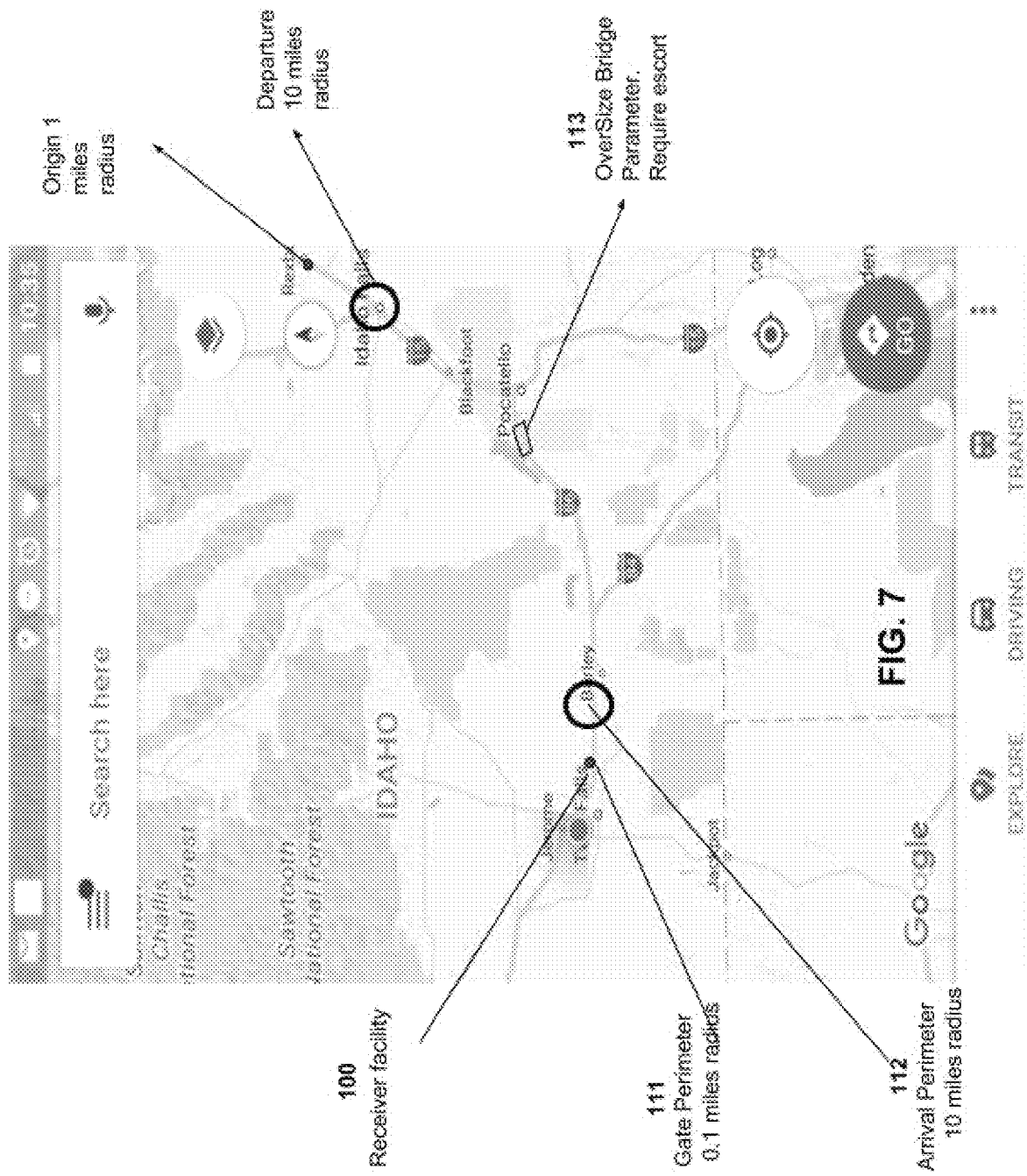
FIG. 7 is the exemplary picture of how the DTSM system enable user to choose and set one or multiple independent geofence perimeter on any given route.

Unit/Cargo Dynamic Traffic and Schedule Management System (DTSM): DTSM applies Dynamic Scheduling Rules (DSR) rules when applicable to manages the incoming/outgoing traffic of unit/cargo by dynamically setting or adjusting the unit/cargo schedules in real time based on unit/load status, predictability-level, priority-level, resource availability and in-house operation speed. System determines the predictability-level for a load/unit based on the unit's progress and delay analyzer results for the unit. The shorter the remaining travel time to the destination the less probability of facing unpredictable delay-inducing-factors, and hence the higher unit's predictability-level. DTSM system coordinates traffic flow by issuing proceed order instructions to incoming or outgoing transport-units on how to proceed to the next predefined applicable geofence perimeter. User (i.e. shipper/receiver, etc.) or system could set one or more geo-fenced perimeter(s) (111, 112, 113) as depicted in FIGS. 6 and 7. FIG. 6 depicts an exemplary method in which users could define a series of concentric geofence perimeter centered around a location (100 i.e. user facility) such that each perimeter (111) is completely enclosed with a higher radius perimeter (112). Alternatively, users could define a set of localized perimeters (111, 112, 113) as depicted in FIG. 7. User could also combine the two-approach. Utilizing DTSM could deny proceed-permission to early or late units once they enter a geofence perimeter (i.e. 111, 112). In absence of proceed-order instructions untimely transports-units will arrive at the facility which in turn either cause the unit to sit idle on in-demand limited facility real estate or add additional unnecessary miles to leave (i.e. due to unavailable parking space for large transport units in cities) and return at the right time. Which may further impact the facility schedule since transport-units with borderline remaining hour of service may not be able to leave or return at a later time since sufficient available hours of service already been used to arrive once. And similarly, would prevent timely unit from approaching and overwhelmed the facility when an unexpected inhouse breakdown occurs. DTSM expands facility's control over the unit far beyond physical geographic boundary of the facility with same level of control and flexibility long before unit/cargo reach the facility.

Figure 8:
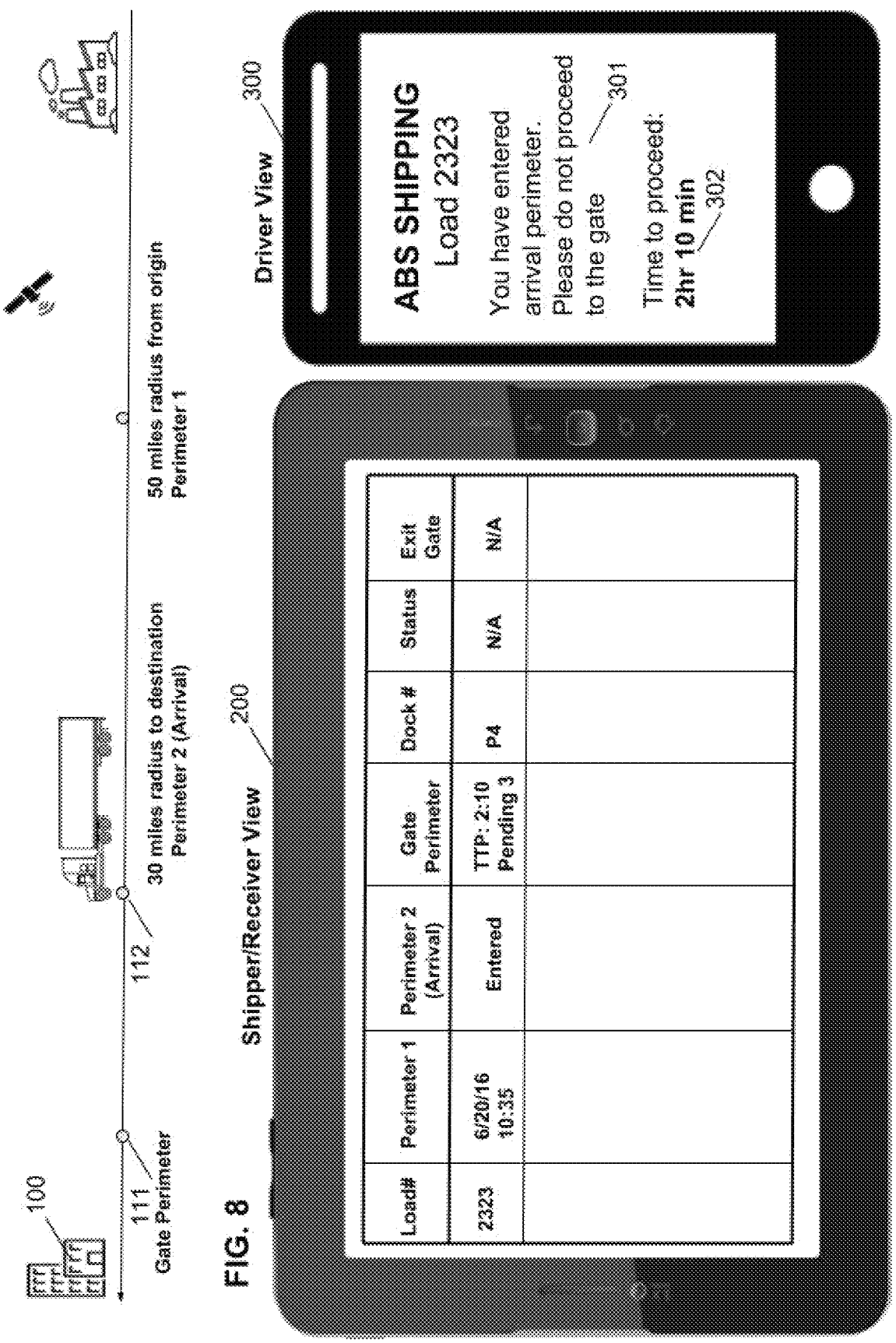
FIG. 8, 9, 10, 11 is the exemplary picture of how the DTSM system monitors, notifies and issues relevant proceed order instructions based on units, resource progress, relevant perimeter and scheduled timelines.

Proceed Order: By constantly monitoring unit/cargo real time GPS location system detects when a transport-unit/cargo arrive or exit a predefined geofence perimeter (111, 112, 113). Once such event is detected system notify all appropriate parties with unit/cargo arrival/departure and transport-unit is presented with an appropriate set of proceed order instruction when applicable. Working in conjunction with in house dynamic scheduling program as described in detail later, system generate and send appropriate proceed orders which could be altered by user in real time or user's predefined instruction. For instance, as depicted in FIG. 8, 9, if applicable, transport-unit will receive an alert via an interface device (300) containing proceed order instruction (301, 303). Optimum result is achieved when user select at least two geofence perimeter namely Arrival Perimeter (112) and Gate Perimeter (111) as indicated in FIG. 6, 7.

Once a unit enters the Arrival Perimeter (112) if the unit will arrive on-time for its scheduled appointment (allowing reasonable time to reach the facility from the perimeter) the unit will be granted permission (303) to proceed to the Gate Perimeter (111). However for units that have arrived earlier or later than their scheduled appointment or when there has been an unexpected delay (i.e. in house resources breakdown) the proceed order to gate will be withheld (301) for affected units giving a projected timeline (302) as depicted in FIG. 8, 9. The projected timeline (302) for each unit is determined by DTSM and is made available to relevant transport-units in order to keep the units informed and prevent untimely units to approach the facility. In the event DTSM receive an update from delay analyzer indicating unrecoverable delay for a unit/load with a fixed or flexible schedule, system would reassign the delayed unit time-slot to the next eligible inline unit and reschedule the unit with unrecoverable delay status for a later time if delay analyzer has projected a new arrival time. When assigning schedule time-slots system similarly give the unit with unrecoverable delay priority over posted loads that are not dispatched unless posted load/unit is tagged with a higher priority-level.

In an event a unit has entered the Arrival Perimeter (112) and is denied permission to proceed (301) pending an expiration of a timeline (302), if unit exit the Arrival Perimeter (112) system will still preserve unit's schedule as long as the unit status remain within timeline that satisfies the scheduled deadline and user's predefined instruction (i.e. 15 min before appointment time). Otherwise system would treat the unit as if it has not yet arrived at the Arrival Perimeter (112). Unit will receive alerts from system when unit status encroaches the required timeline boundary to give the unit sufficient notice to re-enter or remain within acceptable range. System or user could also apply similar rule to other perimeters.

Figure 10:
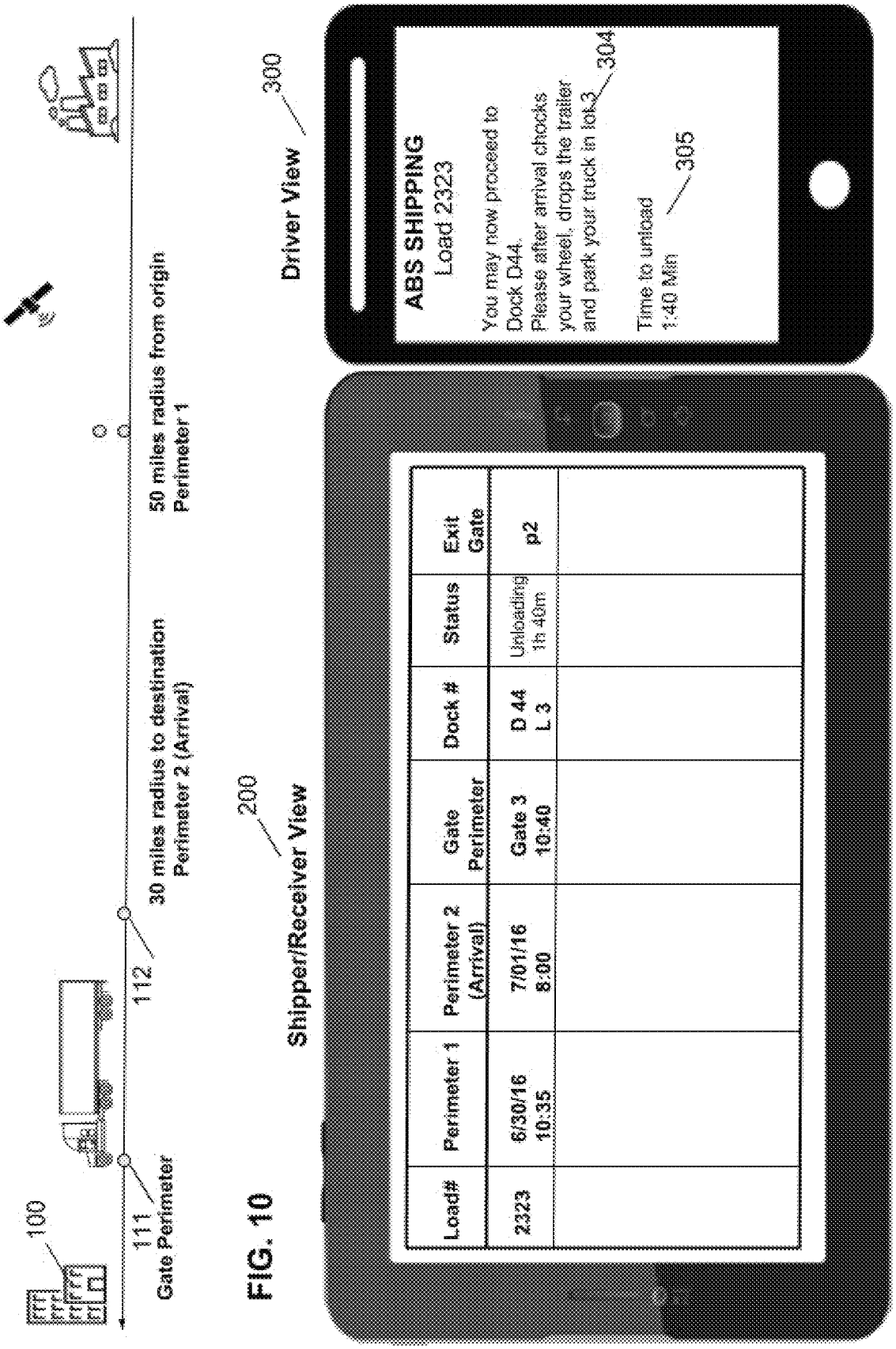
Figure 11:
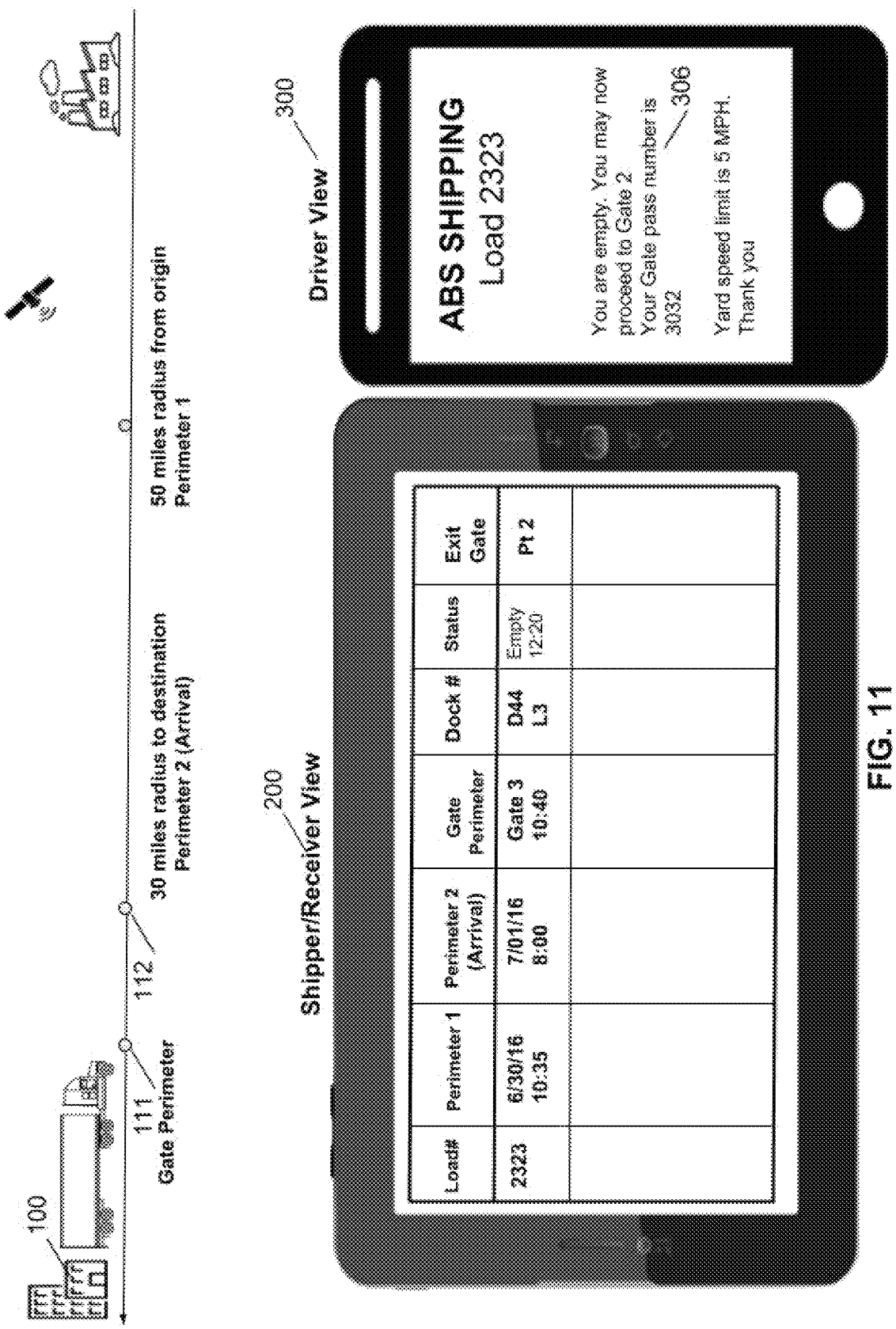
Figure 12:
FIG. 12 is the exemplary picture of how the DTSM system will communicate proceed orders instruction with in motion transport units.
Figure 13:
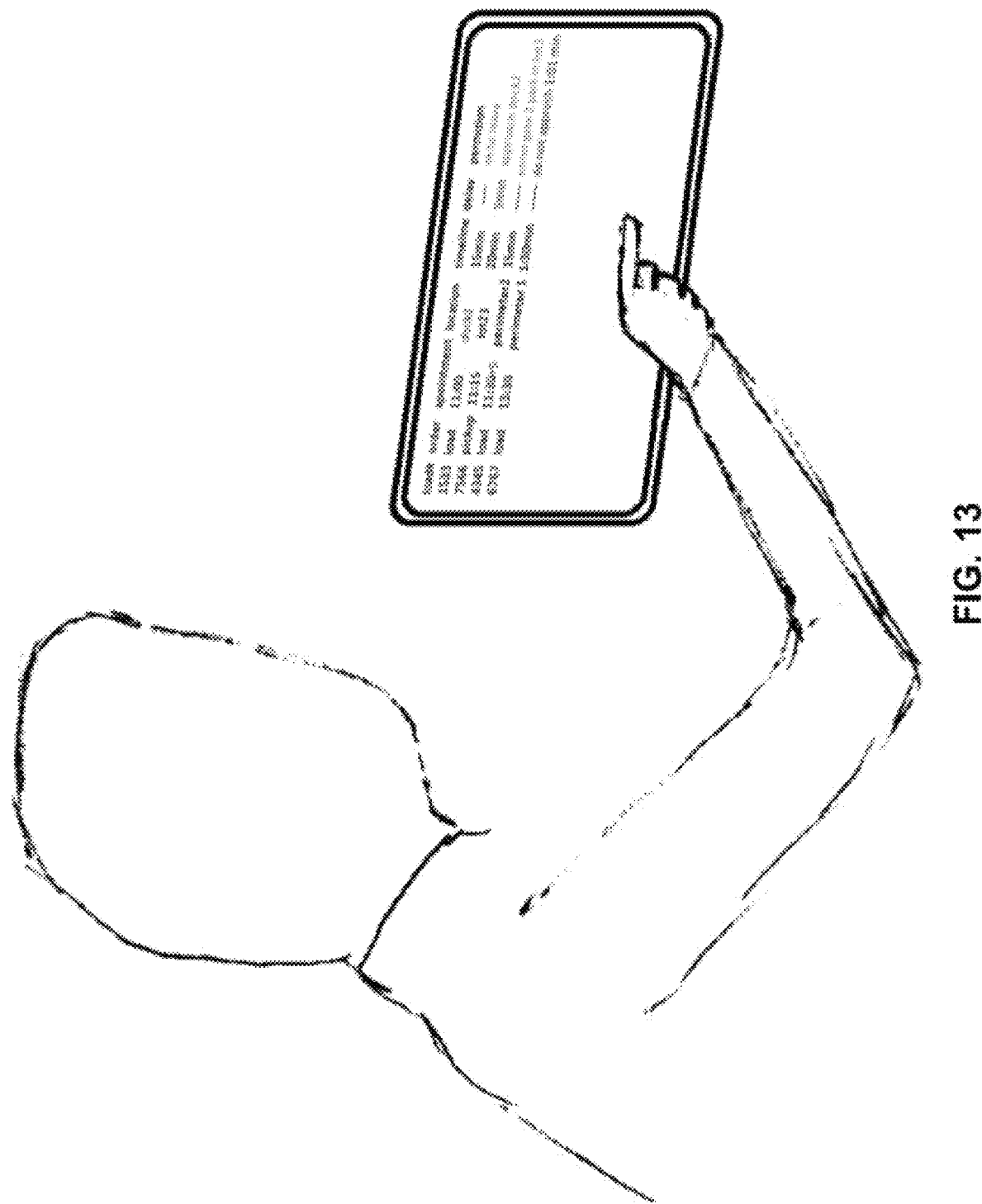
FIG. 13 is the exemplary picture of how the DTSM system display dynamic scheduling and user ability to modify.
Figure 18:
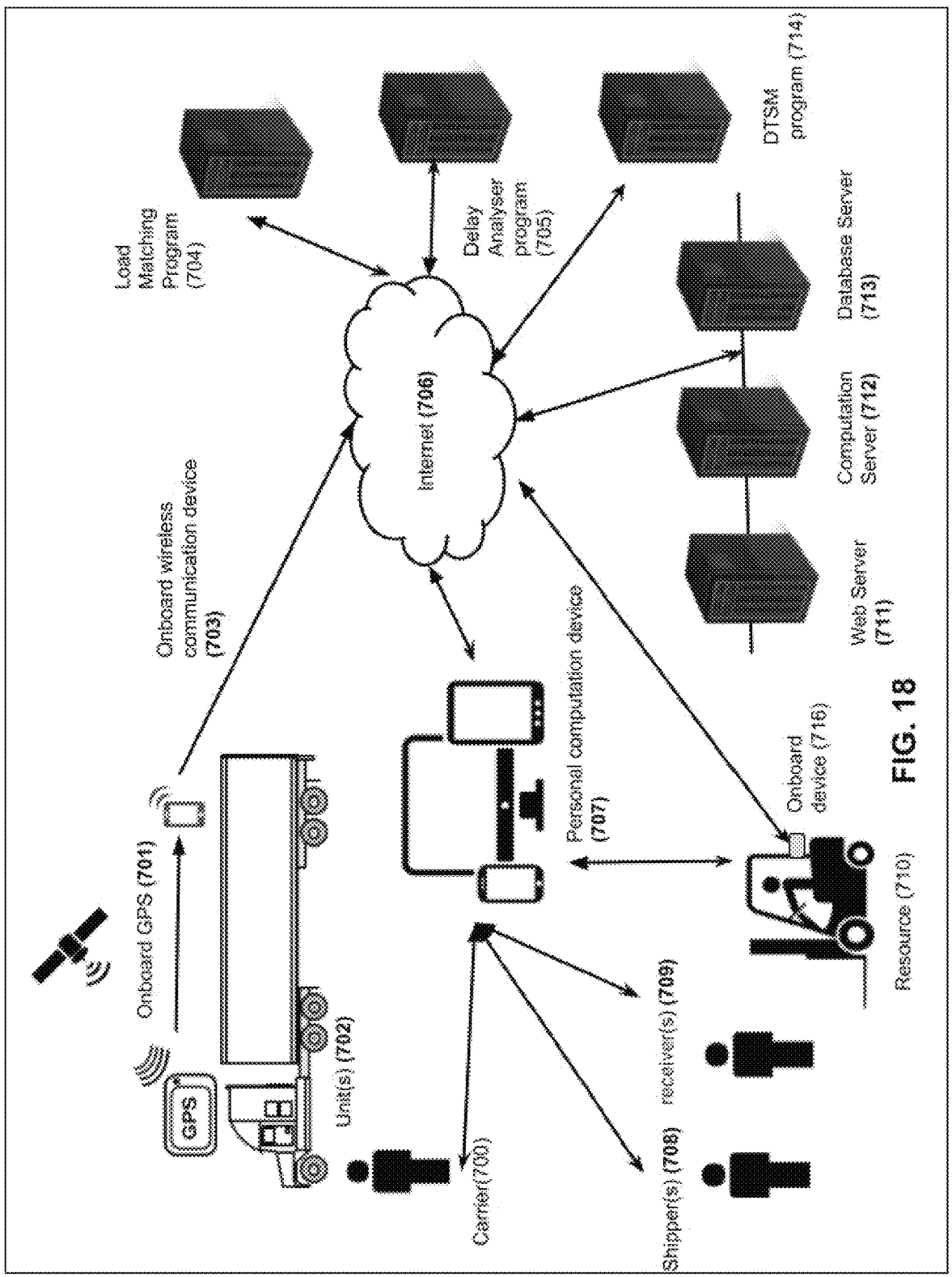
FIG. 18 is depicting one variation of the overall system infrastructure and its components.

Once a unit arrives at the Gate Perimeter (111) system provides the unit with an appropriate instruction including gate number to enter the shipper/receiver facility once arrived. Depending on the unit's appointment time and priority-level the unit will either receive a dock/lot number (304) for loading/unloading with expected required TDT (305), or a lot number to drop the trailer or a park order along with expected delay time as depicted in FIG. 10. If a unit receives a park or drop order unit needs to park or drop trailer at designated place according to received park and drop order instruction and unit's progress is further monitored by system. Once the trailer is dropped upon user verification system will display the location of the trailer/cargo to relevant users. Once the loading/unloading of the unit is completed unit will either receives a pick-up trailer order or dock exit order. For safety purposes system constantly updates facility staff with real time engine activity of the docked units via their respective user interface since system has access to such info via OBD or similar ports which have access to unit's ECM. All mentioned proceed orders could be decided by system automatically based on predefined instruction and adjusted by user in real time (shipping department staff) or combination of both by system suggestion and user approval or modification.

System creates an account for every resource (i.e. shipper-dock 1-lift truck 2) upon user instruction by capturing resource capabilities (i.e. 20 k lbs. lift weight limit per package, height, etc.), responsibility (i.e. loading/unloading, etc.) and limitation (i.e. operate indoor only). Such data could be directly entered by user or system could acquire the necessary data by provided make/model/etc. through third party database. System then creates a resource schedule calendar for each resource in the system identifying availability of each resource in each calendar day (i.e. excluding resource off time, break-time, resource, unavailability due to maintenance etc.). System considers each resource responsibility, capability, limitation and the load TDT in order to assign (or assist user to assign) a committed time-slot or time-range for posted loads according to resource availability. To allow for more flexibility system could consider two or more compatible resource (i.e. facility, similar capability, responsibility) calendars in a pool as one resource for assigning time-slot. (i.e. load could be unloaded by two lift truck in one dock simultaneously). Such data are also used by system to offer applicable resource time-slots to dispatched transport-units upon request as explained in detail later. If a posted load or dispatched unit/cargo is not compatible to any of the in-house resources, system notifies shipper/receiver to register an in house or third-party compatible resource (i.e. crane, tow truck, etc.). System also enables third parties to create a user account. Third party could then be invited and assume the original user role (i.e. shipper, receiver, etc.) and get connected to original user DTSM if third party involvement would require user other resources (i.e. additional second lift truck) or interfere with other time-slot (i.e. in facility operation occupying the loading lot).

Dynamic Scheduling: Depending on user's need, DTSM could be utilized at any time during load lifecycle, from when user (i.e. shipper, receiver) begins to post a load until said load is delivered to destination. For example, user could instruct the system to exclude units from participating in load acquisition and assignment process when unit's URRT would not comply with the load deadline. User could additionally instruct the system to sort or prioritize the matched units/cargo based on the minimum expected arrival time (i.e. unit's URRT) to pick up or destination to be used further in offer negotiation.

User could either use the DTSM's default digital resource schedule program or allow DTSM to have access to user's inhouse resource schedule program. When posting a load (with no assigned unit), DTSM calculates the minimum required time for a given trip by considering RDT and if applicable GRRT effect on RDT so a realistic and feasible timeline could be determined between pickup and delivery location.

Users could either commit to a time-slot or alternatively assign a time-range for a relevant unit/load deadline (pickup or delivery or both). Time-range arrangement could be used if arrival order of the load/unit is not essential as long as the load/unit arrives within the time-range (i.e. first come first served loads, none expedited loads, etc.). Even though system would instruct transport-units (via proceed order instructions) not to arrive untimely to Gate Perimeter (111), however transport-units are not prohibited from arriving early in Arrival Perimeter (112), provided such perimeter is set outside of shipper/receiver facility boundary (i.e. truck stop, rest area, nearby parking lot, etc.). In case user prefers to commit to a time-slot, system assist user by finding and suggesting all open applicable time-slots in the load/unit time-range for compatible resources(i.e. excluding: previously committed time-slots, time-slots with inadequate TDT, relevant resource off-duty break time and time-slots that are the only choice for some dispatched units according to DSR etc.) in the resource schedule calendar.

Floating time-slot is reserved and assigned to dispatched unit/load with time-range arrangement to ensure that all dispatched units/loads could be accommodated in their given time-range. However, for posted load with time-range arrangement system does not reserve a time-slot but only considers posted load TDT in the given time-range to be able to accommodate the load in its time-range if the load is dispatched. Since system has to accommodate any dispatched unit/load within its given time-range, system is no longer allowed to adjust or extend the dispatched unit/load time-range. However, since system does not reserve time-slot for posted load with the time-range arrangement, if the time-range no longer accommodate the load TDT, system is allowed to adjust or extent posted-load time-range when necessary according to DSR.

Once a load/unit with the time-range arrangement is dispatched, a floating time-slot is reserved for the load/unit in the resource schedule calendar within the given load/unit time-range according to Dynamic Scheduling Rules (DSR) as described later. However, to achieve optimum scheduling result, system constantly monitors and switches the floating time-slots for compatible loads/units based on units/loads progress, applicable delay analyzer results and DSR. Two units/loads with time-range arrangement are considered compatible if they have compatible TDT, compatible resource and overlapping time-range. Units/loads with time-range arrangement are allowed to access and choose from the list of remaining available and applicable time-slots (according to DSR) in order to commit to a time-slot any time during the trip. Once a floating time-slot is changed to committed time-slot, such time-slot is no longer automatically switchable. System continues switching floating time-slot until one or more conditions in Dynamic Scheduling Rules (DSR) occurs which requires the system to assign a committed time-slot to affected unit(s).

Figure 9:
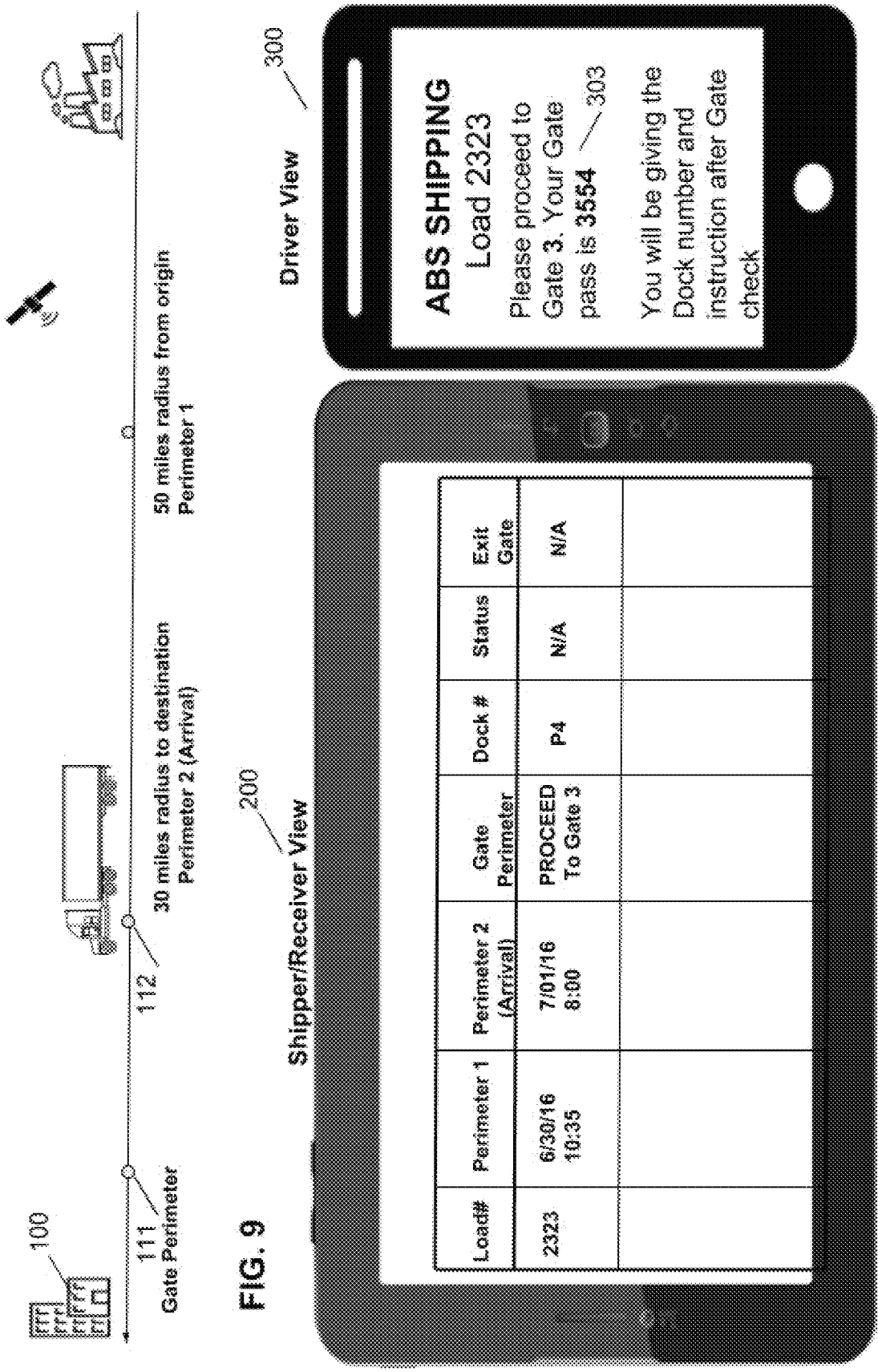

Once a load/unit with the time-range arrangement arrives at the Arrival Perimeter (112), the unit already been given the optimum floating time-slot by system due to its higher predictability-level and shortest travel time to the facility than other loads/units in the shared time-range that have yet to arrive. Therefore, system stops switching the floating time-slot for the units/loads who have arrived in Arrival Perimeter (112). Early arrival to Arrival Perimeter (112) would make any unit eligible for unplanned opening of the compatible resource schedule. In case multiple units with the same priority level and compatible resource are present in the Arrival Perimeter (112), system gives scheduling priority to units based on first come first serve basis. System switches the eligible unit/load time-slot with the newly opened time-slot if not restricted by user. For each unit in the Arrival Perimeter (112), system has to calculate when to issue proceed-to-the-gate order to prevent untimely units/loads to approach the gate. Therefore, system begin by calculating the difference between unit/load required travel time to the facility and current remaining time to the unit/load appointment deadline (reserved time-slot). However, system will add reasonable margin to the required travel time to accommodate functions described later. When the unit/load remaining time becomes less than the adjusted required travel time, system will issue the unit/load with proceed-to-gate order (FIG. 9 303) otherwise unit/load will receive a do-not-proceed order (FIG. 8 301) and time to proceed countdown (FIG. 8 302 the calculate excess time). If earlier newly open applicable time-slot becomes available as described above system will resend a new proceed order and instruction according to newly accepted switched time slot.

System resumes the floating mechanism for units/loads with time-range arrangement who are issued with proceed-to-gate order. System then compares the progress of other similar compatible units with time-range arrangement and switches the applicable floating time-slots by applying DSR rules, where the unit with floating time-slot that has the least remaining time to arrive will get the first available and applicable time-slot. System similarly monitors the progress of units with committed time-slots with proceed-to-gate order. If the unit/load with least amount of time to unrecoverable delay status have earlier appointment than any other compatible units in the group, system will switch the time-slots for the unit/load with the next inline unit in the group (in this case system will make an exception to DSR 6P and DSR 8) when the affected unit has consumed its time margin. If no option is found in the group, system will consider the best option from units present in Arrival Perimeter (112) provided such units can comply with the effected unit's schedule timeline. If unrecoverable delay status is unavoidable, system alternatively finds the best option with least impact on schedule. Once a unit/load arrives at the Gate Perimeter (111), system changes the unit's reserve time-slot to committed time-slot. Once a unit passed the gate, system checks the resource availability timeline and remaining time in order to issue the proceed to dock/lot/drop or park instruction in accordance with predefined instruction (i.e. flatbed loads parking in lot 3 remove securement and tarp and update status or park in lot 2: time to dock 5 min). Once system receives the resource update indicating the task is completed (loading/unloading), system will similarly issue pickup/exit instruction to the unit. System will update all relevant database (i.e. quality and TDT category for driver not complying with proceed order or resource TDT for the load category).

Posted loads with time-range arrangement can share the same start-time with as many other compatible posted loads for a resource. However, the overlapping time-ranges should accommodate the combined load TDT's for all the loads in the time-range. If a dispatched load/unit reserve a time-slot considered for posted loads in the time-range, system will extend time-range for all affected posted load that their TDT could no longer be accommodated. System similarly will extend the end-time of time-range for any newly posted loads that does not fit in the overlapping shared time-range. For posted loads with the time-range arrangement, system will capture and store the earliest time that the load would be ready to be picked up or delivered that hereafter is referred to as load-readiness time (i.e. all parts of product are assembled in case of pickup or earliest time the crane will be ready on delivery site). User could then choose either a start-time or end-time of the time-range in the system (i.e. Mar. 3, 2017 8:00 am) and let the system independently decides the time-range based on the factors such as current capacity of the resource schedule calendar, load-readiness time, load's TDT, load priority and applicable RDT, GRRT and DSR rules described later. Alternatively, user could instruct the system to choose a time-range based on applicable DSR rules by only providing a time-span (i.e. 2 days) and load readiness-time rather than selecting a start-time or end-time. System could also automatically choose a time-span on user's behalf based on the load category (i.e. food grade 2 days) according to a predefined instruction. If time-span method is selected, system will allocate the first available and applicable time according to the load-readiness time in the resource schedule calendar for the posted load for the start-time. It then applies the time-span and any applicable DSR to determine the end-time of the time-range. Lastly user could explicitly define the time-range by selecting both start and end-time. When the start-time is provided by user it will be considered as readiness-time for the load. If load readiness-time is before the load time-range and an earlier compatible time-slot before the time-range becomes available, system extend the time-range to include newly available time if it does not conflict with DSR. System would reject any user selected time-range which conflicts with load's TDT or applicable RDT, RRT, GRRT, URRT. For example, in case user is providing the end-time of the time-range to system and the end-time is placed on an already reserved or committed time-slot, system will instruct the user to adjust the end-time to either earlier or later available time or will reject the time-range. Another example is if resource schedule available on-duty time does not accommodate a new load's TDT in the time-range, system will issue an alert and notify the user to extend the end-time to accommodate the load. Before load is listed or dispatched, system will display the list of all available and applicable time-slots in the time-range that could accommodate the load/unit TDT, so the users could have an accurate insight of timelines before listing a load or committing to a listed load.

When DTSM is tasked to manage the second leg of the trip (receiver schedule), system will apply the same methods for determining the minimum required time and scheduling timelines once the time lines for first leg of the trip are determined. Once the first leg of the trip completed, system will start the same process for second leg. If delay occurred in the first leg and such delays would affect the second leg, system will update, notify or adjust the second leg time line if permitted.

Dynamic Scheduling Rules (DSR)

DSR 1: If system is unable to access the regulated unit required data in order to generate URRT (i.e. not registered or ELD malfunction, etc.) shipper/receiver should select a committed time-slot upon dispatch.

DSR 2: System should prompt user to register a compatible resource and associated resource availability in the registered resource calendar in given load/unit could not be accommodated with the existing registered resource.

DSR 3: System should not assign the load/unit to incompatible resource in the resource schedule calendar based on but not limited to DSR 3A-3D.

DSR 3A: The resource design should be considered for the load requirement (i.e. bucket, fork, traction tire for lot, etc.).

DSR 3B: The resource should be capable of performing the task required by the load characteristic (i.e. lift height, lift weight per single package, etc.).

DSR 3C: The resource should not be misappropriated for the tasks which do not fall under its assigned responsibilities and limitation (i.e. loading/unloading, indoor, outdoor, etc.).

DSR 3D: The resource should be assigned based on optimum speed and cost (i.e. assigning crane to do a lift truck job when a cheaper and faster available lift truck is a better choice etc.).

DSR 4: System should enable the dispatched unit with the time-range arrangement to view, choose and commit to an applicable and available time-slot regulated by DSR 6 as long as the regulated unit URRT is accessible.

DSR 5: Once the regulated dispatched unit URRT become inaccessible for a predefined period of time, system should allocate a committed time-slot according to the last stored URRT data and DSR 6. It then prompts the unit to accept or switch the allocated time-slot from the list of available and applicable time-slots governed by DSR 6. If the URRT data becomes accessible again and the allocated committed time-slot is not confirmed yet, system should restore the unit/load to original floating time-range arrangement if still applicable.

DSR 6: System should manage time-slot for each given unit/load in the resource schedule calendar according to DSR 6A-6S.

DSR 6A: System should always consider the most efficient use of the available resource schedule calendar time in a manner which result in the least amount of unused wasted time.

DSR 6B: System should not break a required unit/load TDT to multiple non-consecutive time-slots. For example, system should not break a 1.5-hour TDT into three non-consecutive 0.5-hour time-slot scattered through the resource schedule calendar. However, system make an exception for reasonable interruption (i.e. lunch break, etc.).

DSR 6C: System should not reserve time-slot for posted loads that are not yet dispatched.

DSR 6D: System should reserve a committed time-slot or floating time-slot for each dispatch unit/load in the resource schedule calendar.

DSR 6E Upon dispatch if the unit/load does not have a committed time-slot, system should reserve the earliest available and applicable time-slot in the resource schedule calendar for the load/unit within the load/unit time-range according to DSR 6.

DSR 6F: System should not reserve the same resource time-slot in an overlapping manner.

DSR 6G: System should immediately remove a time-slot from the list of available time-slots in resource schedule calendar if time-slot become committed and no longer consider or offer that time-slot as an available time-slot.

DSR 6H: As long as two or more compatible floating time-slot falls within the load/unit time-range, they become eligible for switching by system or being offered as a choice to unit/load for commitment with the exception of DSR 6H1-6H2. Two units/loads with time-range arrangement are considered compatible if they have compatible TDT, compatible resource and overlapping time-range.

DSR 6H1: If the unit/load is down to last two floating time-slot where those time-slots are also the only remaining applicable time slots for another unit/load, system will not consider those time-slots for any other unit/load.

DSR 6H2: When a time-slot is the only time-slot option for the unit/load, system will not consider the time-slot for any other units/load.

DSR 6I: System should switch the floating time-slots for compatible loads/units with a shared time-range based on units/loads progress and predictability-level (earliest to arrive get earlier time-slot).

DSR 6I1: System should push the floating time-slots for the load/unit to the next available and applicable time-slot in the load/unit time-range if delay analyzer indicates that unit/load has missed the reserved time-slot.

DSR 6J: If two units/loads are down to the last two floating shared time-slot options, at the moment the unit/load with greater URRT no longer meet the earlier time-slot requirement, system commits the latest time-slot to said unit/load and earlier time slot to the unit/load with less URRT.

DSR 6K: System should not consider time-slots for the unit/load that will result in unrecoverable delay status according to Delay Analyzer program.

DSR 6L: System should not offer time-slots to unit/load which are earlier than unit's URRT.

DSR 6M: System should not switch time-slots that are not compatible with the unit/load URRT or result in unrecoverable delay for unit/load.

DSR 6N: System should not switch a time-slot to an earlier time than projected RVF delay. Similarly, it should not offer such time-slots to the unit/load with ongoing RVF.

DSR 6O: When units/loads could not be accommodate in their original time-range or committed time-slots (i.e. unexpected delay due to in-house resource breakdown, etc.) system should consider least cost/time effect(i.e. prioritizing units with known higher detention cost and in case units have same detention rate prioritizing unit with less TDT to accommodate the most number of units in lease amount of time, etc.). To further reduce impact, system should also consider possibility of switching with unaffected load/unit with the greatest impact from other time-range. (i.e. switching with willing unit from tomorrow's schedule)

DSR 6P: System should not unilaterally switch a committed time-slot without relevant user authorization.

DSR 6Q: System should cancel the reservation and make the time-slot available in the resource schedule calendar if the associated unit/load is tagged with unrecoverable delay status by Delay Analyzer program. System should consider said unit/load as a newly dispatched unit/load when the new arrival time is determined by Delay Analyzer program.

DSR 6R: If a reserved or committed time-slot schedule is cancelled, system should make that time-slot available in resource schedule calendar.

DSR 6S: The load/unit should be given a committed time-slot or time-range. In case of time-range end-time should always be greater than the start-time.

DSR 7: In case user has defined an Arrival Perimeter (112) units present in Arrival perimeter should become eligible for rescheduling for any unplanned opening or unused schedule time. Gate Perimeter (111) should be considered Arrival Perimeter (112) if user has not defined an Arrival Perimeter (112).

DSR 7A: System should give scheduling priority to units/loads with higher priority-level. For example, user (shipper/receiver) could set a priority level in the following order where first item in the list has the highest priority: P1) Load #2343 P2) Hazmat category P3) Expedited category P4) High value cargo category.

DSR 7B: For unit with the same priority level scheduling priority is determined based on the unit/load arrival time to Arrival Perimeter (112) by system.

DSR 8: System is not allowed to adjust the time-range for the unit/load once it is dispatched.

DSR 9: Posted load with time-range arrangement cannot share same start-time with reserved or unavailable time-slot.

DSR 10: Posted load with time-range arrangement cannot share same end-time with reserved or unavailable time-slot.

DSR 11: Posted loads with time-range arrangement can share the same start-time with as many other compatible posted loads for the resource.

DSR 12: If a posted load has a shared overlapping time in its time-range with any other posted load there should be sufficient time-slots to accommodate all the loads TDT in their own time-range in case all the loads in the group were dispatched otherwise engage DSR 16.

DSR 12A: If two posted loads shared any overlapping time in their time-range, at least one of the loads should have more than one option to accommodate its TDT, otherwise engage DSR 16.

DSR 12B: If more than two posted loads shared any overlapping time in their time-range system consider them as a group. There should be sufficient time-slot available to accommodate all the loads in the group in their own time range according to DSR 12, otherwise engage DSR 16.

DSR 12C: When DSR 12 is validating the time-range it should also consider the timeline feasibility for all loads in the group. So a posted load should not share a time-slot at end-time of its time-range with other loads in its group if the load time-range could not be feasible (i.e. offering transport-unit range which could not be accommodate where all the loads are to be dispatched FIG. 19B, Load-4) otherwise system should adjust the time-range of the affected loads to comply.

DSR 13: If the posted load/unit start-time in the time-range is/becomes reserved by system for a dispatched unit or time-slot is/becomes unavailable, if DSR 14 is not applicable, system will shrink the posted load/unit time-range by adjusting the start-time to the next available and applicable time-slot in the time-range given the new time-range still can accommodate the load TDT otherwise system apply DSR 16.

DSR 14: If earlier compatible time before load/unit time-range is/becomes available and the load/unit readiness-time is in compliance with the newly available time-slot, system should adjust the unit/load range start-time to include the time-slot if not conflicting with other DSR rules.

DSR 15: If the posted load/unit end-time in the time-range become reserved by system for a dispatched unit or time-slot is/becomes unavailable, system will shrink the posted load/unit time-range by adjusting the end-time to the next available and applicable time-slot in the time-range given the new time-range still can accommodate the load TDT otherwise system apply DSR 16.

DSR 16: System should adjust the start-time/end-time or both when applicable for affected posted loads/units that do not comply with DSR 12 to the next available and applicable option, where system should adjust the posted load time-range by starting from the newest posted load in the shared time-range to the oldest posted load consecutively until DSR 12 is satisfied.

DSR 17: If posted load time-range is capped by user (i.e. Monday 8 am-12 pm) and all time-slots in the time-range become reserved or unavailable, system should prompt user to provide a new time-range or accept system suggestions for a new time-range.

DSR 18: Posted load should have a sufficient time between first and second leg according to applicable RDT or GRRT.

DSR 19: If a unit is not regulated RRT is used in place of URRT when applicable.

Figure 19A:
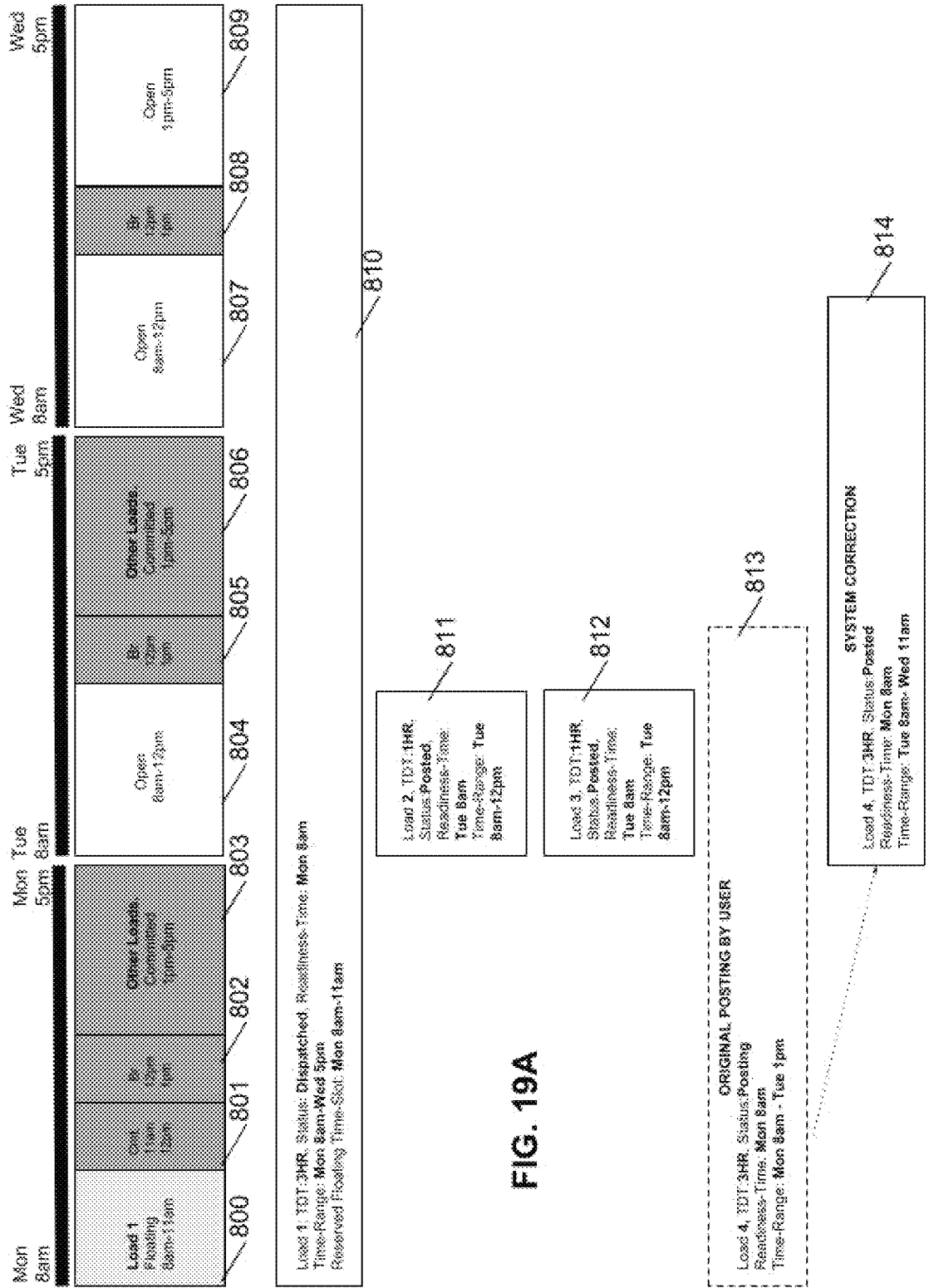
FIG. 19A, 19B, 19C are depicting how DTSM use DSR to set and adjust load/unit schedule in resource schedule calendar.
Figure 19B:
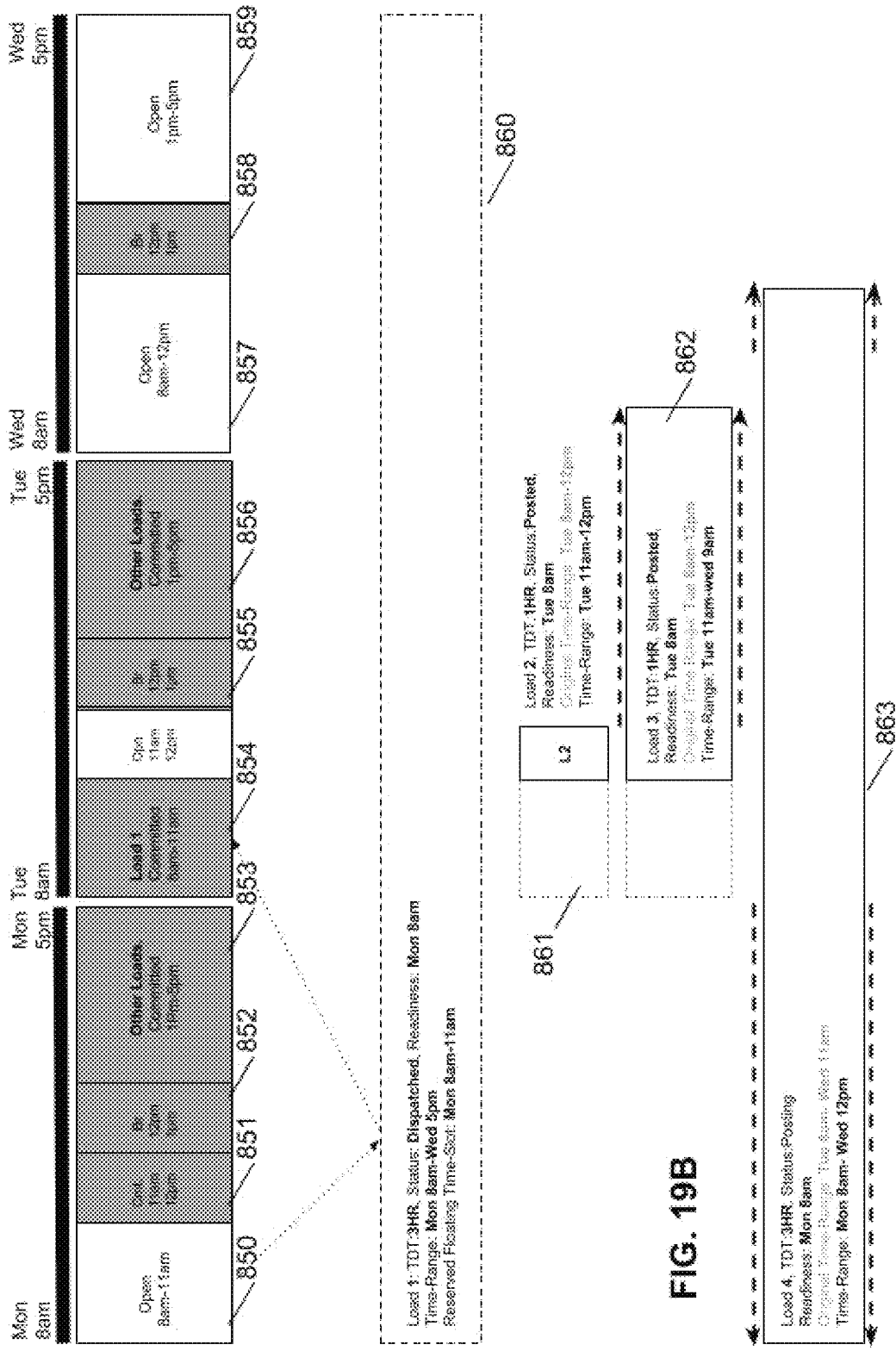
Figure 19C:
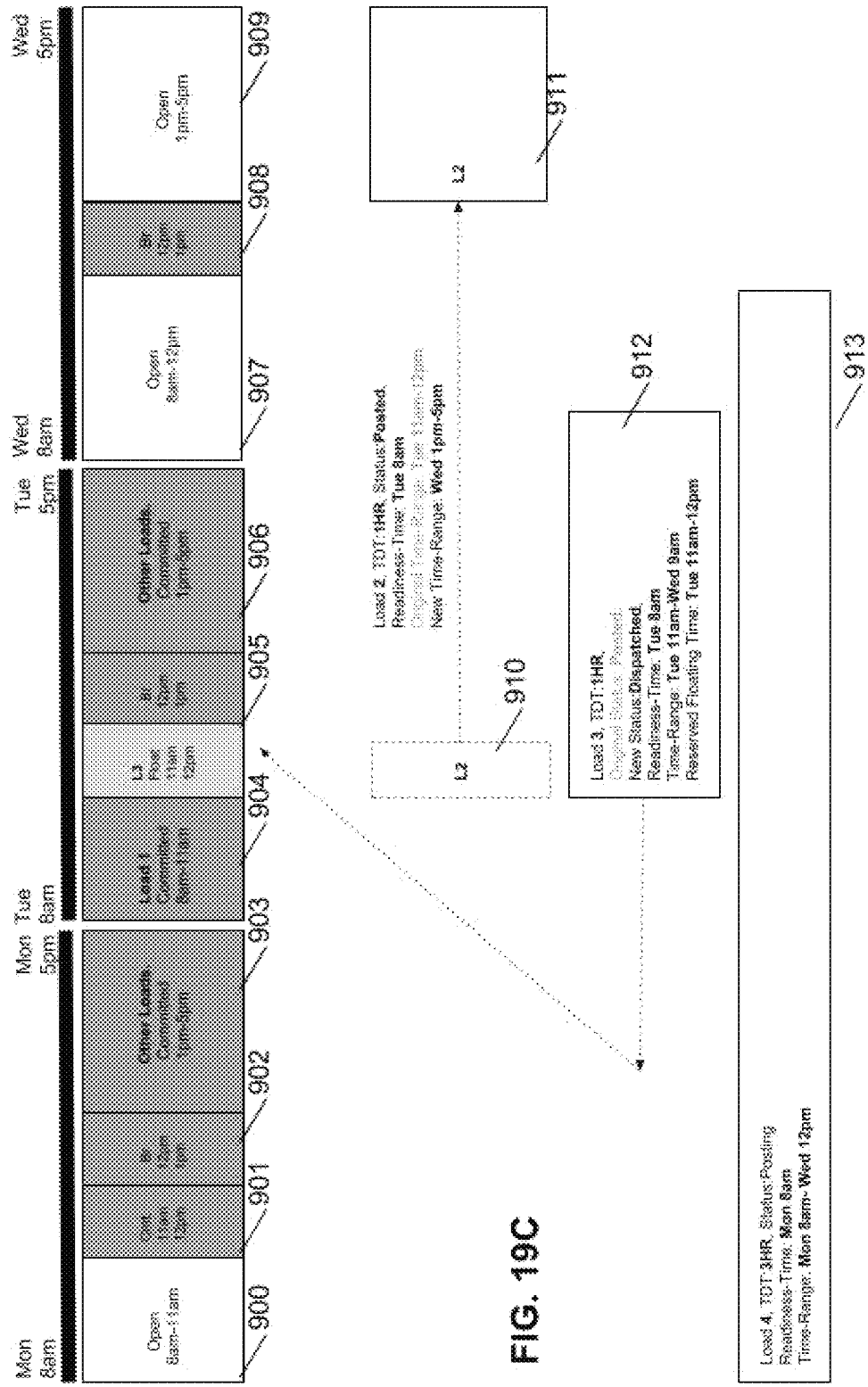

To illustrate how DTSM apply DSR for schedule management, exemplary scenarios 1-3 has been drafted as depicted in FIG. 19A-19C. These scenarios only apply subset of the DSR.

Scenario 1 depicted in FIG. 19A is an exemplary screenshot of resource schedule calendar spanning from Monday 8am to Wednesday 5 pm. In this example the missing time in each calendar day is due to facility shut down off duty hours. Hence the time from 12 am to 8 am and 5 pm to 12 am are blocked and not available to be scheduled by system, therefore they not displayed.

Scenario 1 Initial State:
  Resource off-duty break times (802, 805, 808) and committed time-slots (801, 803, 806) are blocked in schedule and are not available for scheduling.
  Schedule calendar has three open and available time window (804, 807, 809) that could be used for scheduling new posted load/unit or offered to dispatched unit/load.
  load-1 is already dispatched and system has reserved Monday 8 am-11 am (800) floating time slot for the load-1. Load-1 time-range is specified as Monday 8 am to Wednesday 5 pm, TDT set to 3 hours and readiness-time set to Monday 8 am (810).
  load-2 is already posted with the time-range of Tuesday 8 am-12 pm, TDT of 1 hour and readiness-time set to Tuesday 8 am (811)
  load-3 is already posted with the time-range of Tuesday 8 am-12 pm, TDT of 1 hour and readiness-time set to Tuesday 8 am (812)

Scenario 1 New Actions:
  1. User attempted to post load-4 with readiness-time set at Monday 8 am, TDT of 3 hours and time-range of Monday 8 am to Tuesday 1 pm (813).
  2. DTSM system detects a conflict in proposed time-range start-time (Monday 8 am) according to DSR 9 as it falls within the reserved time-slot for load-1 (800). Hence system shrink the time-slot by moving the start-time to the next applicable and available open time (Tuesday 8 am) according to DSR 13. Posted loads could share start-time with any many other posted loads according to DSR 11.
  3. DTSM system detects a conflict in proposed time-range end-time (Tuesday 1 pm) according to DSR 10 as it falls within an unavailable time-slot in resource schedule calendar (805). Hence system shrink the time-slot by moving the end-time to the next applicable and available open time (Tuesday 12 pm) according to DSR 15.
  4. System detect that the adjusted load-4 time-range (Tuesday 8 am-12 pm) conflicts with DSR 12 as it cannot accommodate all the posted loads TDT (load-2, load-3, load-4) in the shared time-range (Tuesday 8 am-12 pm). The calculation indicates there is only 4 hours available and the combined load TDT for the time range adds up to 5 hours (3+1+1). Hence system adjust load-4 time-range by extending the end-time to next available and applicable time in the calendar according to DSR 16 which is Wednesday 11 am (814).

Scenario 2 (FIG. 19B) initial states is the end state of scenario 1. In this scenario, load-1 requests the list of available time-slot so it could pick a committed time-slot. System present load-1 with following list of 7 options according to DSR 4: Monday 8 am-11 am, Tuesday 8 am-11 am, Tuesday 9 am-12 pm, Wednesday 8 am-11 am, Wednesday 9 am-12 pm, Wednesday 1 pm-4 pm, Wednesday 2 pm-5 pm as these times are available and applicable in the load-1 time-range (Monday 8 am-Wednesday 5 pm) according to DSR 4.

1. Load-1 select Tuesday 8 am-11 am (854). System check user request for chosen time-slot to determine if the time-slot is still applicable according to DSR 6F. In this example system accept the request and make the selected time-slot unavailable in resource schedule according to DSR 6G and award the time-slot as committed time-slot to load-1. Subsequently system make the originally reserved floating time-slot (850) available according to DSR 6R.
  2. DTSM System detects that load-4 readiness-time of Monday 8am meets DSR 14, hence it extends the start-time from Tuesday 8 am to Monday 8 am (863) to include the newly opened time-slot Monday 8 am-11 am (850).
  3. DTSM system detects load-2 time-range start-time (Tuesday 8 am) conflict with DSR 9 as it falls within the reserved time-slot for load-1 (854). Hence system shrink the time-slot by moving the start-time to the next applicable and available open time (Tuesday 11 am) according to DSR 13.
  4. DTSM system detects load-3 time-range start-time (Tuesday 8 am) conflicts with DSR 9 as it falls within the reserved time-slot for load-1 (854). Hence system shrink the time-slot by moving the start-time to the next applicable and available open time (Tuesday 11 am) according to DSR 13.
  5. At this point the adjusted time-range for load-2 is Tuesday 11 am-12 pm, load-3 is Tuesday 11 am-12 pm, load-4 is Monday 8 am-Wednesday 11 am. Due to activity on the posted loads time-range, system recheck all the shared time-range for affected loads (load 2, 3, 4) to make sure all the loads with overlapping time comply with DSR 12. System detects load-2, load-3, load-4 share Tuesday 11 am-12 pm in their time-range. Since there are more than 2 loads with shared time, system consider load 2, 3, 4 as a group and engage DSR 12B. System detects if load-2 is dispatched on Tuesday 11 am-12 pm, load-3 could not be accommodated in its time-range (Tuesday 11 am-12 pm) hence in violation of DSR 12. Therefore, system engage DSR 16 starting with the latest posted load which is load-4 and determines that load-3 has to be extended to next available applicable time to Wednesday 9 am. Extending load-3 results in another shared time-range between load-3 and load-4 on Wednesday 8 am-9 am. Hence system invoke DSR 12A but determines both loads comply. System determines load-4 is not in compliance with DSR 12C because provided time-range of load-4 would incorrectly imply that a transport-unit could deliver the load on Wednesday 8 am-11 am. This is due to the fact that is load-2 and load-3 were to be dispatched before load-4, load-4 could not be feasibly accommodated on Wednesday. Hence in order not to mislead the transport-unit, system has to make the load-4 time-range feasible which is to adjust load-4 time-range to the next feasible, available and applicable time, in this case extending the time-range to Wednesday 12 pm.

Scenario 3 (FIG. 19C) initial states is the end state of scenario 2.

1. load-3 is dispatched but transport-unit does not commit to a time-slot. Hence according to DSR 6E system reserves the earliest applicable floating time-slot on Tuesday 11 am-12 pm (905) which is within load-3 time-range of Tuesday 8 am-Wednesday 9 am (912).
2. DTSM system detects that load-2 time-range start-time (Tuesday 11 am) conflicts with DSR 9 as it falls within the reserved time-slot for load-3 (905). Even though load-2 was posted before load-3 however now it become irrelevant since load-3 is a dispatched load which make the load eligible for reserved time-slot.
3. Since load-2 end-time range was capped at Tuesday 12 pm (910) by user system will issue alert and notify user to adjust load-2 time-range with new suggested timeline according to DSR 17. In this case user has selected Wednesday 1 pm-5 pm (911).

Switching committed time-slot: System is provisioned with a mechanism to allow switching committed time-slots for cases where it is necessary to find a less cost-effective option and to offer flexibility to transport units when it would not negatively affect the shipper/receiver. System will enable users to voluntary switch compatible committed time-slots when does not conflict with shipper/receiver instruction or DSR. If carrier, driver, shipper or system itself is interested to switch a committed time-slot scheduled appointment time to earlier or later time they could reflect such request in the system database via associated accounts and interface. System then match all available compatible options and list the results under the available appointment time section. Once a user selects one of the available options, the opposing side will receive a notification. The opposing side then could accept or reject the arrangement. If both parties agreed to switch scheduled appointments, system notifies and request the shipper/receiver approval if shipper/receiver was the party who set the schedule originally. Shipper rejection or approval could be done manually in real time or preset and stored in database. When system check and pass all required checklist (i.e. user permission, DSR, etc.) system will switch appointments time-slot.

Gate Pass: System manages and authorizes incoming and outgoing cargo/unit to user facility by monitoring and comparing the unit's digital credential, unit's GPS location in database, unit's physical credential (i.e. tractor/trailer: VIN number, plate number, make, model and color as well as driver's license information), and location of the unit at facility gate in addition to verification of the proceed orders and relevant timelines. System can operate in fully automatic mode (utilizing motorized gate, scanners, camera, sensors and required interface, etc.) or by providing instruction to the facility security stuff to allow or deny entry to the facility or be alert of unauthorized entry. System starts by receiving the unit's physical credential (i.e. license plate, truck number, carrier name etc.) and load order data via user interface (i.e. security guard or interface at gate) or appropriate camera/sensors. System then verifies if the unit is associated with a load order in the database (i.e. pickup or delivery load number) for that facility. System then check the unit proceed orders and time lines (i.e. the unit should have an issued proceed order and have arrived within given timeline). System then verifies whether the GPS footprint of the unit at the gate matches the GPS tracking history record and triggered geofence perimeters (111, 112, 113) of the unit that is associated with the load in database. The unit is denied entry if system observe any of the followings irregularities regarding unit/load GPS data: a) any anomaly in triggered geofences timeline. b) if the associated unit's real time GPS location is different from shipper's gate facility at that moment. c) if the unit has contradictory location in the system. d) if the load/trailer GPS and associated unit GPS are not both present when applicable. In addition to the physical credentials, digital credentials should also match to what is listed in database for the associated unit. Digital credentials are known to the system when the unit is dispatched. By acquiring unit's GPS location and UHOSDL, system would also gain access to unit GPS device id, electronic logging device id and associated unit VIN number and if applicable load/trailer GPS and Id from load data. Additionally, in order for unit to receive proceed order transport unit interface device already should have been registered in the system. Hence system may also have the interface device id. Once a unit arrives at the gate and become identified as a unit with associated load order for the facility, system checks all available device ids that are associated together for the load/unit order. If all applicable device ids and VIN number are associated with the correct GPS Id and the GPS Id indicating the gate location, system approves the digital credential of the unit. This is to prevent an imposter unit to be able to pick up a load just by having access to some credentials, whereas now the imposter should also present all the digital credentials matching the database. Since all of the process is automatic and is performed by system it is very difficult to have all the physical and electronic credential in order to steal a load from carrier (i.e. trailer swap) or facility. Only when all necessary physical and digital credential verified, system will instruct the security stuff or motorized gate to allow the unit to enter or exit. If unit received the gate pass and entered the facility, system continues monitoring the unit location according to the load or proceed orders to insure the unit movement is in accordance with orders and timelines. If system detects an unauthorized movement (i.e. wrong location, direction, movement in excess of required travel time to the designated dock/lot, etc.) or if the unit did not comply with order timeline (i.e. unit did not go to the loading dock or exit after exit order issued) system will tag the unit as unauthorized activity and notify relevant users.

Shipper/Receiver in-house operation: The resource should be connected to the system via interface or electronic module. In case of robotic operation relevant data would be automatically sent and received to robotics platform. Once a robot or operator would indicate the completion of a task (i.e. empty/loaded order) system will be updated via the resource interface or the robot platform. System will then update the affected inline orders and send appropriate proceed order to affected units/load or in yard units (i.e. yard dog) and adjust data for the next leg of the trip and relevant users if applicable. System could additionally operate and use the signaling green or red lights placed outside of docks for driver backing or exit instruction in addition to automatic trailer restraining system. Similarly, if warehouse or yard internal operation is affected by unexpected machinery breakdown or staff shortage, system similarly notifies affected units and withholds or withdraws proceed orders from affected units, until the next update status is received from in house operation server.

How System Calculates TDT: System use Resource Task Duty Time (TDT) in various mechanisms such as unrecoverable delay detection, RVF alert generation and DTSM system. TDT is also used by system or user to adjust the offers for load acquisition negotiation. Hence an accurate measurement of the TDT affect the accuracy of the mechanisms utilizing the measured TDT. In simplest form TDT could be entered manually by users. However, to increase accuracy system methods and machine learning could be utilized to generate or enhance the accuracy of the data.

To determine TDT system or user creates an account for every identifiable resource (i.e. shipper-dock 1-lift truck 2) and provide the capabilities (i.e. 20 k lbs. limit per single package) and task responsibility (i.e. loading, unloading, etc.) for each individual resource. Every time a task is performed by a resource, system creates a new record in database by capturing relevant factors such as activity type, resource type, transport-unit type, commodity, task time to name a few. system further use these records to determine the average TDTs.

for reporting TDT. Because even though both loads weight are similar however second load took less time than the first. In comparison fluctuation percentage of number of pallets is far greater than weight. Hence system determines that added package type is responsible for extra time so even if a similar lighter load is scheduled to arrive system now only considers package numbers to determine how much TDT is required to complete the task. Using same concept system considers more elaborate mathematical and statistical analysis based on various factors and continuously monitor future similar loads to determine accurate TDT.

System could receive the required and relevant data from multiple sources at the same time to determine accurate resource TDT. However, through machine learning system always considers the most reliable source, preferring robotics data over users or accepts the TDT corroborated by multiple source (i.e. similar timelines) vs a contradictory resource. Example of such sources are DTSM reporting the task completion time from docking order to exit order, resource task completion indication via device input, driver ELD duty status change or many other collaborating sources such as warehouse robotic orders and status updates. Similarly, same logic could be extended to drive and unit tasks

TABLE 1

Example of a typical record captured.

| Task | Unit Type | Load Commodity | Package Type | # of Units | Weight (lbs.) | Facility | Dock | Resource ID | Task Time (minute) | Date/Time |
|---|---|---|---|---|---|---|---|---|---|---|
| Unloading | RF53 | Frozen Chicken | Palette | 4 | 40K | Walmart 122 | 4 | Lift Truck 22 | 120 | Oct. 3, 2017 8:50 am |
| Loading | RF48 | Frozen Chicken | Palette | 4 | 60K | Walmart 122 | 3 | Lift Truck 28 | 180 | Oct. 3, 2017 10:00 am |

Utilizing data mining and machine learning technology system creates TDT categories by associating all relevant factors for each task such as task type, cargo package type, transport-unit type to name a few. Every cargo package type is identifiable by the manner in which is or will be loaded on transport-unit. Each cargo parameter is measured and recorded based on number of packages, applicable size, weight, etc. (i.e. 5T steel roll, 4-10 k, 4×4×6 pallet or 48 k lbs. corn bulk package). Each load could be the combination of multiple package or commodities; however, all packages must be individually identifiable, and their parameters should be measurable by the industry standards. Some package types are already standardized and tailored to simplify the cargo movement across multiple points (i.e. pallet, box, barrel, etc.). Load parameters must be recorded (i.e. load size, weight, number of packages, gallon, etc.) to keep parties accountable upon switching custody (i.e. from shipper to carrier to consignee). Hence such data are available to system via load posting software, bill of lading, packing list, etc. via any accessible digital portal or directly entered in system by users. Therefore, system can access load package types, size, parameters, and all associated relevant factors to identify and categorize each cargo and measure the TDT based on performance of associated identifiable resource. System then refines the finding by comparing similar cargo data and determines the effect of a factor or factors (i.e. package type, weight, etc.) on each individual resource performance time. One example where machine learning could be applied is: if a load of 40 k frozen chicken packaged in 12 pallets took 40 min to unload, while another load of 40 k frozen chicken packaged in 6 pallets took 30 min system consider package type instead of weight such as load securement, tarping, unit fuel per mile/day, driver's daily required inspection of unit etc.

The invention claimed is:

1. A method of optimizing and mitigating traffic and scheduling for cargo and transport-unit comprising:
   accessing, by a processor, data of a transport unit, wherein a computing device includes the processor, wherein the processor is coupled with a memory, and wherein the processor is configured to communicate with a user device;
   accessing, by the processor, a load-list associated with a facility and selecting a load with a pending stop from the load-list, wherein the pending stop is selected according to shipment data associated with the load;
   determining, by the processor, whether the pending stop does or does not have an assigned schedule:
      when determined that the pending stop does not have the assigned schedule, assigning, by the processor, a schedule to the pending stop, wherein the schedule includes a deadline, and wherein the schedule is determined according to a first set of rules; and
      when determined that the pending stop does have the assigned schedule:
         when determined that the assigned schedule for the pending stop is a committed-timeslot, selecting, by the processor, a start of the committed-timeslot as the deadline of the schedule; and
         when determined that the assigned schedule for the pending stop is a time-range:
            reserving, by the processor, a floating-timeslot for a compatible resource associated with the facility; and selecting, by the processor, an end of the time-range as the deadline of the schedule;
after selecting the deadline of the schedule for the pending stop:
acquiring, by the processor, the data of the transport-unit, wherein the data of the transport-unit is transmitted from an on-board device of the transport-unit associated with the pending stop; and
determining, by the processor, a minimum required travel time for the transport-unit to the pending stop by factoring in any associated limitation of the transport-unit; and
determining, by the processor, an arrival-status based on a comparison of the minimum required travel time for the transport-unit and a remaining amount of time to the deadline, wherein the arrival status is on-time or unrecoverable-delay;
when the arrival-status is determined to be the unrecoverable delay, adjusting, by the processor, the schedule based on a second set of rules; and
when the arrival-status is determined to be the on-time:
when the deadline is determined to be the committed-timeslot, re-selecting, by the processor, the load with the pending stop from the load-list; and
when the deadline is determined to be the time-range:
generating, by the processor, one or more boundaries associated with the compatible resource of the facility;
selecting, by the processor, any transport-unit compatible with the one or more boundaries;
switching, by the processor, the floating time-slot for the transport-unit according to a third set of rules; and
assigning, by the processor, the committed time-slot to the transport-unit, wherein the committed time-slot is determined according to the third set of rules; and
in response to detecting a change in at least one of: the data of the transport-unit, data of the facility associated with the compatible resource, and the shipment data associated with the load, performing an associated action by conforming to a fourth set of rules, wherein performing the associated action includes:
generating, by the processor, an updated schedule according to the fourth set of rules; and
conducting, via one or more instructions communicated by the processor, loading or unloading of the transport-unit by the compatible resource in accordance with the updated schedule or controlling, via one or more instructions communicated by the processor, arrival of the transport-unit in accordance with the updated schedule.

2. The method of claim 1, wherein determining, by the processor, the arrival-status includes determining, by the processor, a "recoverable delay variable factor".

3. The method of claim 2, further comprising determining, by the processor, the "recoverable delay variable factor" by conforming to a set of instructions and issuing, by the processor, an associated alert.

4. The method of claim 1, wherein determining, by the processor, a minimum required travel time for the transport-unit to the pending stop by factoring in any associated limitation of the transport-unit includes detecting, by the processor, an effect of an associated limitation of the transport-unit to determine the minimum required travel time.

5. The method of claim 1, wherein determining, by the processor, the arrival status is on-time or unrecoverable-delay includes determining, by the processor, an unrecoverable-delay status for a respective transport-unit that is matched to a posted load.

6. The method of claim 3, further comprising adjusting, by the processor, a transport-unit driver quality in the memory when the driver has arrival status changes to the unrecoverable-delay.

7. The method of claim 1, wherein performing the associated action includes adjusting, by the processor, a transport-unit quality in the memory when the processor determines the unrecoverable-delay is caused by breakdown of the transport-unit.

8. The method of claim 1, wherein conforming, by the processor, to one of the first, second, third, or fourth set of rules includes conforming, by the processor, to Dynamic Scheduling Rules in determining the rules.

9. The method of claim 1, wherein performing the associated action includes generating, by the processor, a proceed order instruction in accordance with the arrival status or a resource availability.

10. The method of claim 9, further comprising adjusting, by the processor, a transport-unit driver quality in the memory when a driver fails to comply with the proceed order.

11. The method of claim 1, wherein performing the associated action includes assigning, by the processor, a time-slot according to a predetermined priority level.

12. The method of claim 11, further comprising determining, by the processor, the predetermined priority level based on cost.

13. The method of claim 1, wherein performing an associated action includes determining, by the processor, compatible time-slots of a resource for the transport-unit and communicating, by the processor, the compatible time-slots to a user device.

14. The method of claim 13, further comprising committing, by the processor, a selected compatible time-slot received from the user device for the resource in the memory and updating, by the processor, the compatible time-slots of the resource for another transport-unit in the memory.

15. The method of claim 1, further comprising, when the arrival-status is determined to be the unrecoverable delay, adjusting, by the processor, the schedule based on the second set of rules including adjusting, by the processor, another schedule of the facility affected by the unrecoverable delay.

16. The method of claim 1, further comprising, when the arrival status is determined to be the unrecoverable delay, adjusting, by the processor, the schedule based on the second set of rules including adjusting, by the processor, the schedule of another facility affected by the unrecoverable delay.

17. The method of claim 9, further comprising generating, by the processor, the proceed order based on the arrival status in a boundary associated with the compatible resource of the facility.

18. The method of claim 11, wherein the predetermined priority level is determined, by the processor, based on a transport-unit arrival order to a predetermined boundary.

19. The method of claim 2, further comprising issuing, by the processor, an instruction on how to mitigate the determined recoverable delay variable factor.

20. The method of claim 1, wherein performing the associated action includes determining, by the processor, a resource loading or unloading performance time based on a load characteristic.

21. The method of claim 20, further comprising determining, by the processor, an average loading or unloading performance time of the facility based on the load characteristic or a package type.

* * * * *